United States Patent
Osaki

(10) Patent No.: US 8,140,864 B2
(45) Date of Patent: Mar. 20, 2012

(54) COMPUTER SYSTEM, STORAGE SYSTEM, AND DATA MANAGEMENT METHOD FOR UPDATING ENCRYPTION KEY

(75) Inventor: Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1073 days.

(21) Appl. No.: 12/010,049

(22) Filed: Jan. 18, 2008

(65) Prior Publication Data

US 2008/0260159 A1    Oct. 23, 2008

(30) Foreign Application Priority Data

Apr. 18, 2007  (JP) ................................ 2007-109651

(51) Int. Cl.
H04L 29/06 (2006.01)

(52) U.S. Cl. ...................................................... 713/193

(58) Field of Classification Search ................... 713/193
See application file for complete search history.

(56) References Cited

U.S. PATENT DOCUMENTS

| | | | |
|---|---|---|---|
| 6,480,096 B1 * | 11/2002 | Gutman et al. ............. | 340/5.31 |
| 7,330,997 B1 * | 2/2008 | Odom ......................... | 714/6.23 |
| 2004/0143733 A1 * | 7/2004 | Ophir et al. ................. | 713/153 |
| 2004/0236958 A1 * | 11/2004 | Teicher et al. .............. | 713/193 |
| 2006/0064604 A1 * | 3/2006 | Osaki .......................... | 713/193 |

FOREIGN PATENT DOCUMENTS

JP    2005-303981    11/2004

* cited by examiner

*Primary Examiner* — Jason Gee
(74) *Attorney, Agent, or Firm* — Volpe and Koening, P.C.

(57) ABSTRACT

A computer system encrypts write-data to be written to the volume in response to a write command. The system transmits a rekey command from host computer system to the storage system when the key data stored in the host key data memory is changed to second key data. The storage system receives the rekey command transmitted from host computer system and stores the first and second key data contained in the received rekey command to a volume key data memory of the storage system. The storage system reads out data encrypted with the first key data from an original block address in the volume. The storage system decrypts the data read out from the volume using the first key data. The storage system encrypts the data decrypted by the first key data using the second key data, and writs the data encrypted with the second key data to the original block address.

5 Claims, 20 Drawing Sheets

COMPUTER SYSTEM, STORAGE SYSTEM, AND DATA MANAGEMENT METHOD FOR UPDATING ENCRYPTION KEY

CROSS-REFERENCE TO RELATED APPLICATIONS

The present application claims the priority based on Japanese Patent Application No. 2007-109651 filed on Apr. 18, 2007, the disclosure of which is hereby incorporated by reference in its entirety.

BACKGROUND

1. Technical Field

The present invention relates to storage technology for management of saved data in a computer system, and relates in particular to rekeying technology for modifying key data used in data encryption and decryption.

2. Related Art

Conventional computer systems including a host computer system and a storage system that are connected via a network have employed, as the data encryption/decryption process format for encrypting and decrypting data, a format in which the encryption/decryption process is carried out on the host computer system end, as well as a format in which the encryption/decryption process is carried out on the storage system end have been used. Where encryption/decryption is carried out on the host computer system end, since the data is encrypted before it reaches the storage system over the network, the format is more advantageous in terms of security against leakage of information, as compared with the format in which the encryption/decryption process is carried out on the storage system end.

In some instances, rekeying, which involves modifying the key data used for encryption and decryption, is carried out for the purpose of improving security against leakage of information. JP-A-2005-303981 discloses technology for processing data access to a volume, while executing a cryptographic conversion process that uses new key data to re-encrypt data that was encrypted with old key data and that is stored in the volume.

SUMMARY

While carrying out the encryption/decryption processes on the host computer system end is more advantageous in terms of security against leakage of information than is carrying out the processes on the storage system end, in instances where rekeying is performed, since the encryption/decryption process and cryptographic conversion process are all executed on the host computer system end, processing overload on the host computer system was a problem.

With the foregoing in view, it is an object of the invention to provide technology whereby security against leakage of information can be maintained, while also be able to reduce the processing load on the host computer system end in instances where key data is modified.

The invention is adapted to address the aforementioned issue at least in part, and can be reduced to practice as the following embodiments. A computer system according to an aspect of the invention is a computer system comprising: a host computer system that processes data; a storage system that comprises a volume accessible through specification of a series of block addresses from the host computer system via a network; a host encryption controller that, on the host computer system end of the network on an access path leading from the host computer system to the volume via the network, controls encryption and decryption of data passing over the access path; and a volume management controller that, in the storage system, manages data stored in the volume; wherein the host encryption controller includes: a host key data memory for storing key data to be used in encryption and decryption of data; a host encryption unit that, when write-data to be written to the volume in response to a write command issued from the host computer system to the storage system is transferred from the host computer system to the volume via the network, encrypts the write-data using the key data stored in the host key data memory, before transferring the write-data over the network; a host decryption unit that, when read-data to be read from the volume in response to a read command issued from the host computer system to the storage system is transferred from the volume to the host computer system via the network, decrypts the read-data using the key data stored in the host key data memory, after transferring the read-data over the network; a rekeying unit that changes the key data stored in the host key data memory from first key data to second key data; and a rekey command transmission unit that, when the rekeying unit changes the key data stored in the host key data memory to second key data, transmits to the volume management controller a rekey command containing the first and second key data; and the volume management controller includes: a rekey command reception unit that receives the rekey command transmitted by the rekey command transmission unit; a volume key data memory for storing the first and second key data contained in the rekey command received by the rekey command reception unit; a conversion read unit that, when the rekey command reception unit receives the transmitted rekey command, reads out data encrypted with the first key data from an original block address in the volume; a conversion decryption unit that, using the first key data stored in the volume key data memory, decrypts the data read out by the conversion read unit; a conversion encryption unit that, using the second key data stored in the volume key data memory, encrypts the data decrypted by the conversion decryption unit; and a conversion write unit that writes the data encrypted with the second key data by the conversion encryption unit, to the original block address.

According to the computer system described above, encryption/decryption of access data exchanged between the host computer system and a volume can be executed on the host computer system end, and in the event that the key data used to encrypt this access data is to be modified, re-encryption of volume data stored in the volume can be executed on the storage system end. As a result, it is possible to reduce the processing load on the host computer system end in instances where key data is modified, while ensuring security against leakage of information.

The embodiments of the invention are not limited to a host computer system embodiment, and various other embodiments are possible as well, for example: various devices making up a computer system, such as a host computer system or storage system; programs for implementing by means of a computer at least some of the functions of these devices; a recording medium having recorded thereon in computer-readable form at least some of these programs; or a data management method. However, the invention is in no wise limited to the embodiments listed above, and can be reduced to practice in various other ways without departing from the spirit of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with reference to the accompanying drawings in which.

DESCRIPTION OF THE PREFERRED EMBODIMENTS

In order to provide a fuller understanding of the constitution and operation of the invention set forth hereinabove, a computer system in which the invention is implemented will be discussed below, in the following order:

A. Embodiment 1,
   A1. Computer system configuration,
   A2. Computer system operation,
   A3. Effects;
B. Embodiment 2;
C. Embodiment 3;
D. Embodiment 4;
E. Embodiment 5;
F. Embodiment 6;
G. Other Embodiments.

Figure 1:
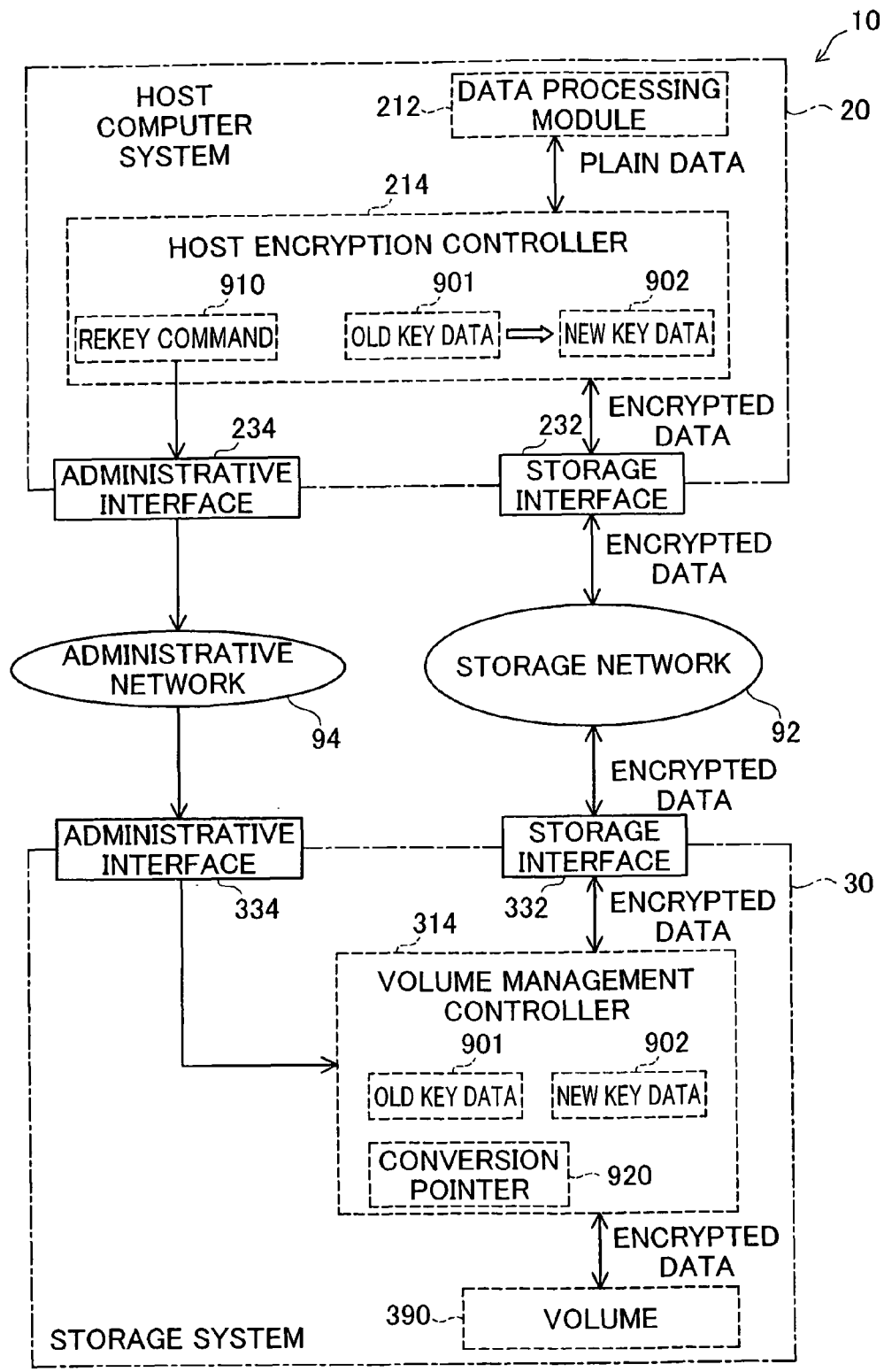
FIG. 1 is an illustration depicting functionally a simplified configuration of a computer system.

A. Embodiment 1
   A1. Computer System Configuration:

FIG. 1 is an illustration depicting functionally a simplified configuration of a computer system 10. The computer system 10 has a host computer system 20 for processing data; and a storage system 30 constituting a volume 390 that is accessible from the host computer system 20. In FIG. 1, with a view to keeping the drawing simple only a single host computer system 20 is shown, but in actual practice the computer system 10 could be provided with a number of host computer systems 20.

As shown in FIG. 1, the computer system 10 is additionally furnished with a storage network 92 and an administrative network 94 which connect the host computer system 20 and the storage system 30 so as enable mutual communication among them. In the present embodiment, the storage network 92 is utilized in data communications for the purpose of accessing the volume 390, while the administrative network 94 is utilized in data communications granted privileges to administer the computer system 10. While in the present embodiment the storage network 92 and the administrative network 94 are constituted as separate networks, as another embodiment the storage network 92 and the administrative network 94 could be constituted as a single network. In the present embodiment, data communications over the storage network 92 and the administrative network 94 are based on TCP/IP (Transmission Control Protocol/Internet Protocol) standard. While in the present embodiment, data communications take place based on the iSCSI (Internet Small Computer System Interface) standard using TCP/IP, as another embodiment data communications could take place based on the Fibre Channel (FC) standard.

As shown in FIG. 1, the host computer system 20 of the computer system 10 has a data processing module 212 and a host encryption controller 214. The data processing module 212 of the host computer system 20 accesses the volume 390 of the storage system 30 and processes data. The host encryption controller 214 of the host computer system 20 holds key data used in encryption and decryption of data, and performs encryption of data being written from the data processing module 212 to the volume 390, as well as decryption of data being read from the volume 390 to the data processing module 212. Thus, on the access path leading from the data processing module 212 to the volume 390 via the storage network 92, unencrypted plain data is exchanged on the data processing module 212 side of the host encryption controller 214, and encrypted data is exchanged on the volume 390 side of the host encryption controller 214. In the event that key data used for encryption and decryption of data by the host encryption controller 214 is to be modified from old key data 901 to new key data 902, the host encryption controller 214 will transmit to the storage system 30 via the administrative network 94 a rekey command 910 indicating that the key data in the host encryption controller 214 has been modified. The storage system 30 is thereby notified of the fact that the key data has been modified on the host computer system 20 end. In the present embodiment, the rekey command 910 includes the old key data 901 and the new key data 902. The operation of the host encryption controller 214 will be discussed in detail later.

Figure 2:
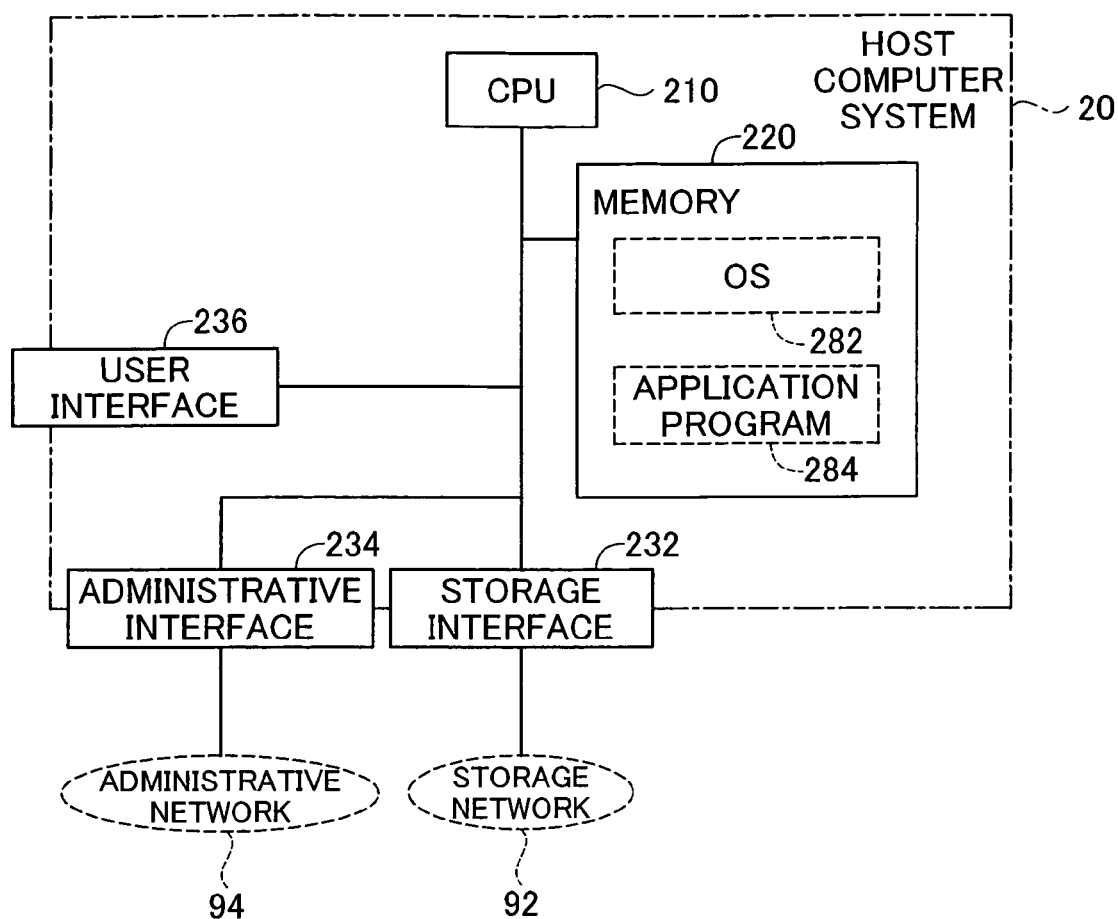
FIG. 2 is an illustration primarily depicting the specific configuration of the host computer system in the computer system.

FIG. 2 is an illustration primarily depicting the specific configuration of the host computer system 20 in the computer system 10. The host computer system 20 has a central processing unit (hereinafter CPU) 210 for controlling the various parts of the host computer system 20; a memory 220 for saving data handled by the CPU 210; a storage interface 232 for exchange of data with the storage system 30 through the storage network 92; an administrative interface 234 for exchange of data with the storage system 30 through the administrative network 94; and a user interface for accepting data input from the user.

The memory 220 of the host computer system 20 stores programs for operating the CPU 210, namely, an operating system (OS) 282, as well as an application program 284. In the present embodiment, the data processing module 212 of the host computer system 20 is implemented through operation of the CPU 210 in accordance with the OS 282 using the memory 220. Also, in the present embodiment, the host encryption controller 214 of the host computer system 20 is implemented through operation of the CPU 210 in accordance with the OS 282 using the memory 220; however, as another embodiment, it could be implemented instead through operation of the CPU 210 in accordance with the application program 284.

Referring back now to FIG. 1, the storage system 30 of the computer system 10 has a volume management controller 314, in addition to the volume 390. The volume management controller 314 of the storage system 30 executes writing of data to the volume 390, in accordance with data access from the host computer system 20 to the volume 390 through the storage network 92. In the event that the storage system 30 has received a rekey command 910 from the host computer system 20, the volume management controller 314, using the old key data 901 and the new key data 902 contained in the rekey command 910, will convert the encrypted data stored in the volume 390 from data encrypted with the old key data 901 to data encrypted with the new key data 902. The volume management controller 314 will then manage the data encryption conversion in the volume 390, using a conversion pointer 920 that specifies addresses for storing the data that has been encrypted with the new key data 902. The specifics of the operation of the volume management controller 314 will be discussed later.

Figure 3:
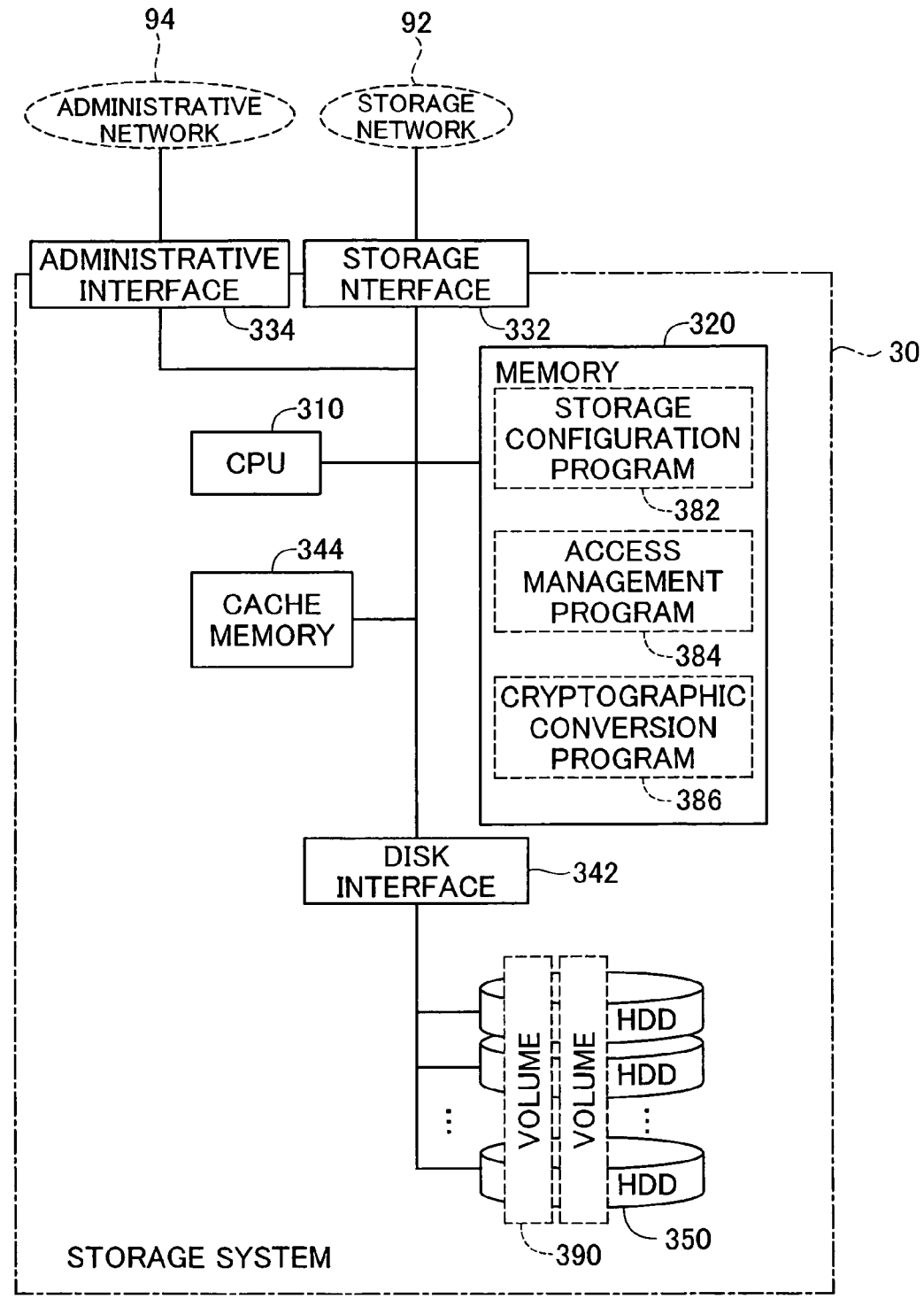
FIG. 3 is an illustration primarily depicting the specific configuration of the storage system in the computer system.

FIG. 3 is an illustration primarily depicting the specific configuration of the storage system 30 in the computer system 10. The storage system 30 has a CPU 310 for controlling the various parts of the storage system 30; a memory 320 for saving data handled by the CPU 310; a storage interface 332 for exchange of data with the host computer system 20 through the storage network 92; an administrative interface 234 for exchange of data with the host computer system 20 through the administrative network 94; a plurality of hard disk drives (HDD) 350; a disk interface for carrying out exchange of data with the plurality of HDD 350; and a cache memory 344 for temporarily saving data being exchanged between the storage interface 332 and the disk interface 342. The storage system 30 includes a system having controller devices composed of a CPU, memory, and so on, and a group of storage devices composed of HDD.

The memory 320 of the storage system 30 has stored therein, by way of programs for operating the CPU 310, a storage configuration program 382, an access management program 384, and a cryptographic conversion program 386. In the present embodiment, the volume management controller 314 of the storage system 30 is implemented by means of operation of the CPU 310, in accordance with the access management program 384 and the cryptographic conversion program 386 using the memory 320. In the present embodiment, the volume 390 of the storage system 30 is logically configured by means of management of the plurality of HDD 350 by RAID (Redundant Arrays of Independent (Inexpensive) Disks) technology, by the CPU 310 in accordance with the storage configuration program 382 using the memory 320. The storage devices that make up the volume 390 are not limited to HDD, and it would be acceptable to instead use semiconductor memory, or a combination of HDD and semiconductor memory.

Figure 4:
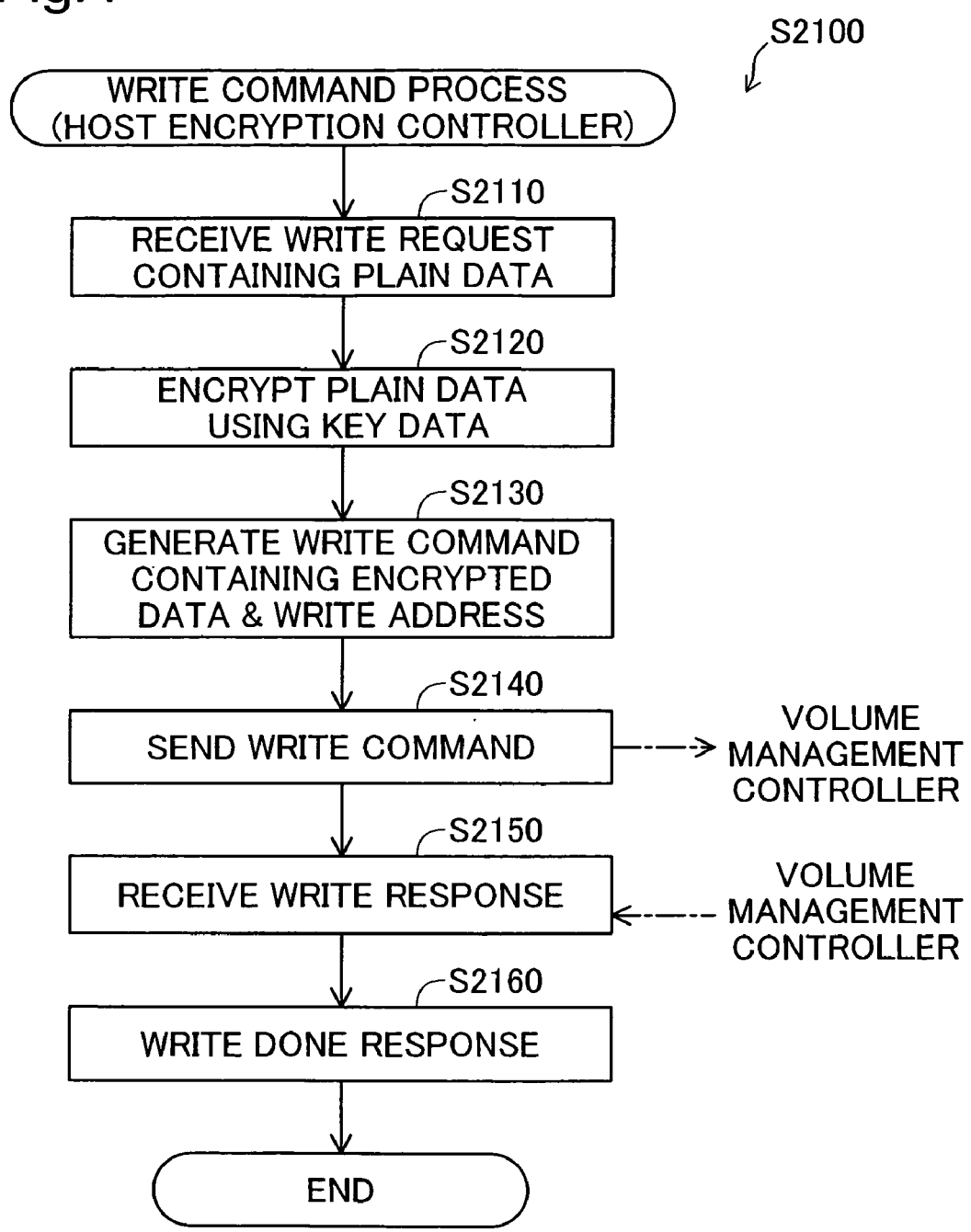
FIG. 4 is a flowchart illustrating a write command process executed by the host encryption controller in the computer system.

A2. Computer System Operation:

FIG. 4 is a flowchart illustrating a write command process (Step S2100) executed by the host encryption controller 214 in the computer system 10. In the present embodiment, the write command process (Step S2100) of FIG. 4 is implemented through software-controlled operation of the CPU 210 of the host computer system 20. In the present embodiment, in the event that a write request requesting to write data to the volume 390 is sent from the data processing module 212, the host encryption controller 214 will initiate the write command process of FIG. 4 (Step S2100).

Once the host encryption controller 214 initiates the write command process (Step S2100) of FIG. 4, it receives the write request from the data processing module 212 (Step S2110). In the present embodiment, a write request sent from the data processing module 212 will include unencrypted plain data to be written to the volume 390, and a write address indicating a block address in the volume 390, to which the data is to be written.

When the host encryption controller 214 receives the write request (Step S2110), it encrypts the plain data included in the write request, using the key data held in the host encryption controller 214 (Step S2120). The host encryption controller 214 subsequently generates a write command (Step S2130). The write command generated by the host encryption controller 214 includes the encrypted data created by encrypting the plain data included in the write request, as well as the write address that was included in the write request. After generating the write command (Step S2130), the host encryption controller 214 transmits the write command to the volume management controller 314 via the storage network 92 (Step S2140).

Subsequently, the host encryption controller 214 receives from the volume management controller 314 a write response indicating that the data was written to the volume 390 in accordance with the write command (Step S2150). The host encryption controller 214 then delivers to the data processing module 212 a Write Done response indicating that writing of data to the volume 390 has been completed (Step S2160).

Figure 5:
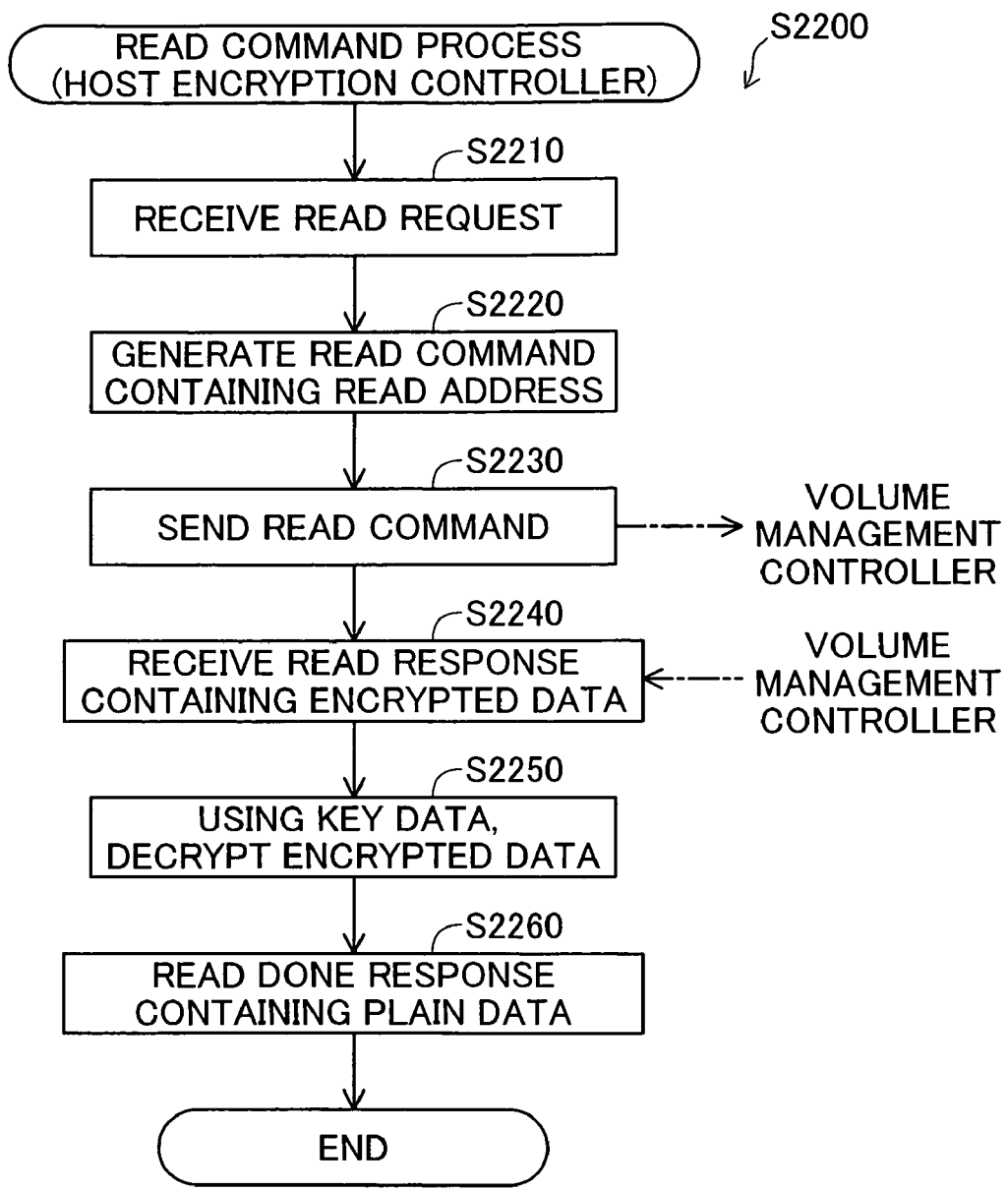
FIG. 5 is a flowchart illustrating a read command process executed by the host encryption controller in the computer system.

FIG. 5 is a flowchart illustrating a read command process (Step S2200) executed by the host encryption controller 214 in the computer system 10. In the present embodiment, the read command process (Step S2200) of FIG. 5 is implemented through software-controlled operation of the CPU 210 of the host computer system 20. In the present embodiment, in the event that a read request requesting to read data from the volume 390 is sent from the data processing module 212, the host encryption controller 214 will initiate the read command process of FIG. 5 (Step S2200).

Once the host encryption controller 214 initiates the read command process (Step S2200) of FIG. 5, it receives the read request from the data processing module 212 (Step S2210). In the present embodiment, a read request sent from the data processing module 212 will include a read address indicating a block address in the volume 390, for reading out the data.

When the host encryption controller 214 receives the read request (Step S2210), it generates a read command that includes the readout address that was included in the read request (Step S2220). The host encryption controller 214 then transmits the read command to the volume management controller 314 via the storage network 92 (Step S2230).

Subsequently, the host encryption controller 214 receives from the volume management controller 314 a read response indicating that the encrypted data was read out from the volume 390 in accordance with the read command (Step S2240). Then the host encryption controller 214, using the key data held in the host encryption controller 214, decrypts the encrypted data included in the read response (Step S2250). The host encryption controller 214 then delivers to the data processing module 212 a Read Done response that includes the plain data decrypted from the encrypted data that was included in the read response (Step S2260).

Figure 6:
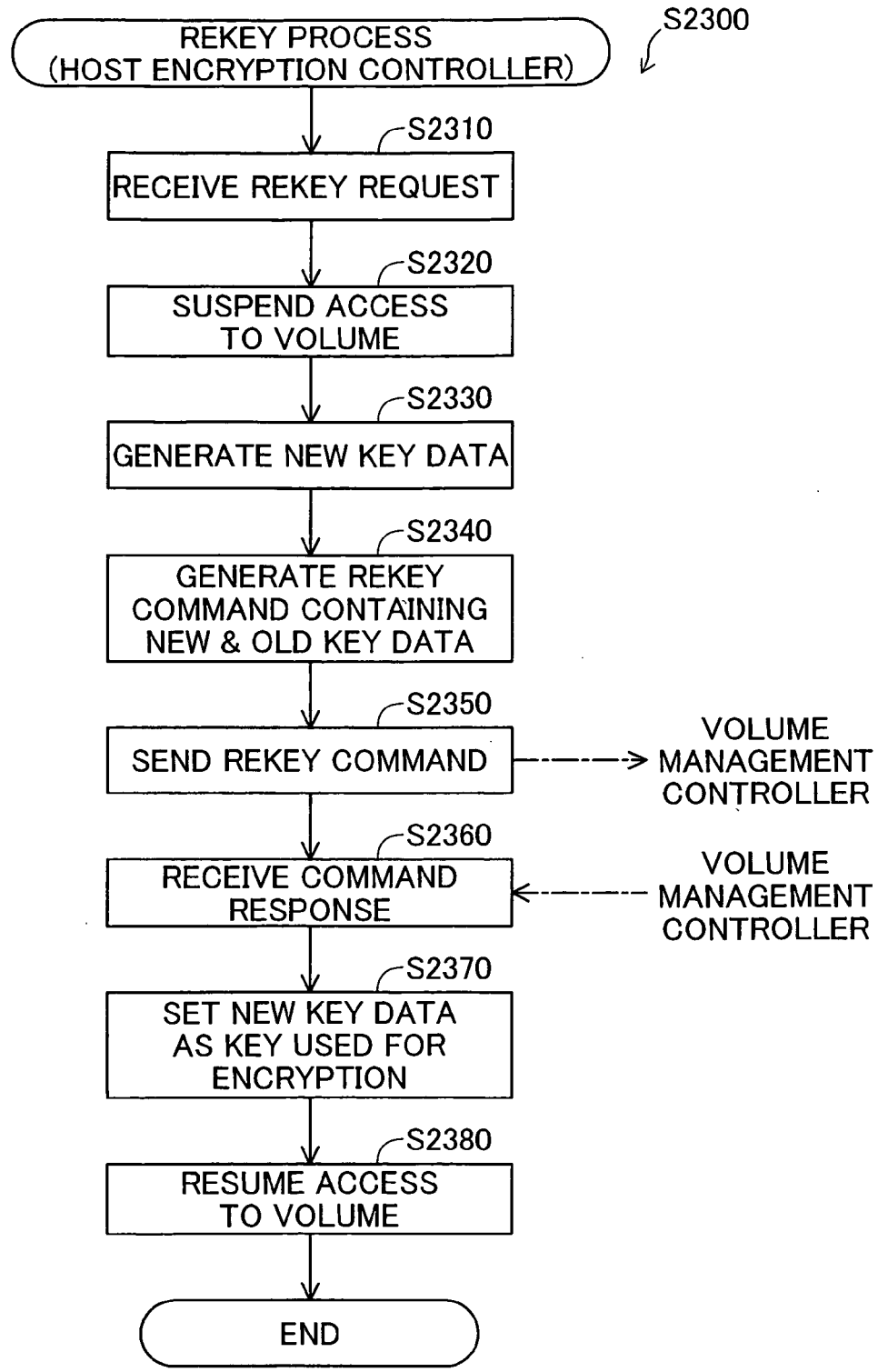
FIG. 6 is a flowchart illustrating a rekeying process executed by the host encryption controller in the computer system.

FIG. 6 is a flowchart illustrating a rekeying process (Step S2300) executed by the host encryption controller 214 in the computer system 10. In the present embodiment, the rekeying process (Step S2300) of FIG. 6 is implemented through software-controlled operation of the CPU 210 of the host computer system 20. In the present embodiment, in the event that a rekey request instructing that the key data be updated is received by the user interface 236 or the administrative interface 234, the host encryption controller 214 will initiate the rekeying process (Step S2300) of FIG. 6.

Once the host encryption controller 214 initiates the rekeying process (Step S2300) of FIG. 6, it receives the rekey request from the user interface 236 or the administrative interface 234 (Step S2310). Subsequently, the host encryption controller 214 suspends access to the volume 390 by the data processing module 212 (Step S2320) by disabling the write command process (Step S2100) and the read command process (Step S2200). The host encryption controller 214 then generates new key data 902 on the basis of the rekey request (Step S2330). The host encryption controller 214 then generates a rekey command 910 that includes the old key data 901 and the new key data 902 (Step S2340). Subsequently, the host encryption controller 214 transmits the rekey command 910 to the volume management controller 314 via the administrative network 94.

The host encryption controller 214 then receives from the volume management controller 314 a command response indicating that preparation is complete for modifying the key data in the volume management controller 314 (Step S2360). The volume management controller 314 then replaces the old data 901 with the new data 902 for use as the key data for encryption/decryption held in the memory 220 (Step S2370). The volume management controller 314 then enables initiation of the write command process (Step S2100) and the read command process (Step S2200), to resume access to volume 390 by the data processing module 212 (Step S2380).

Figure 7:
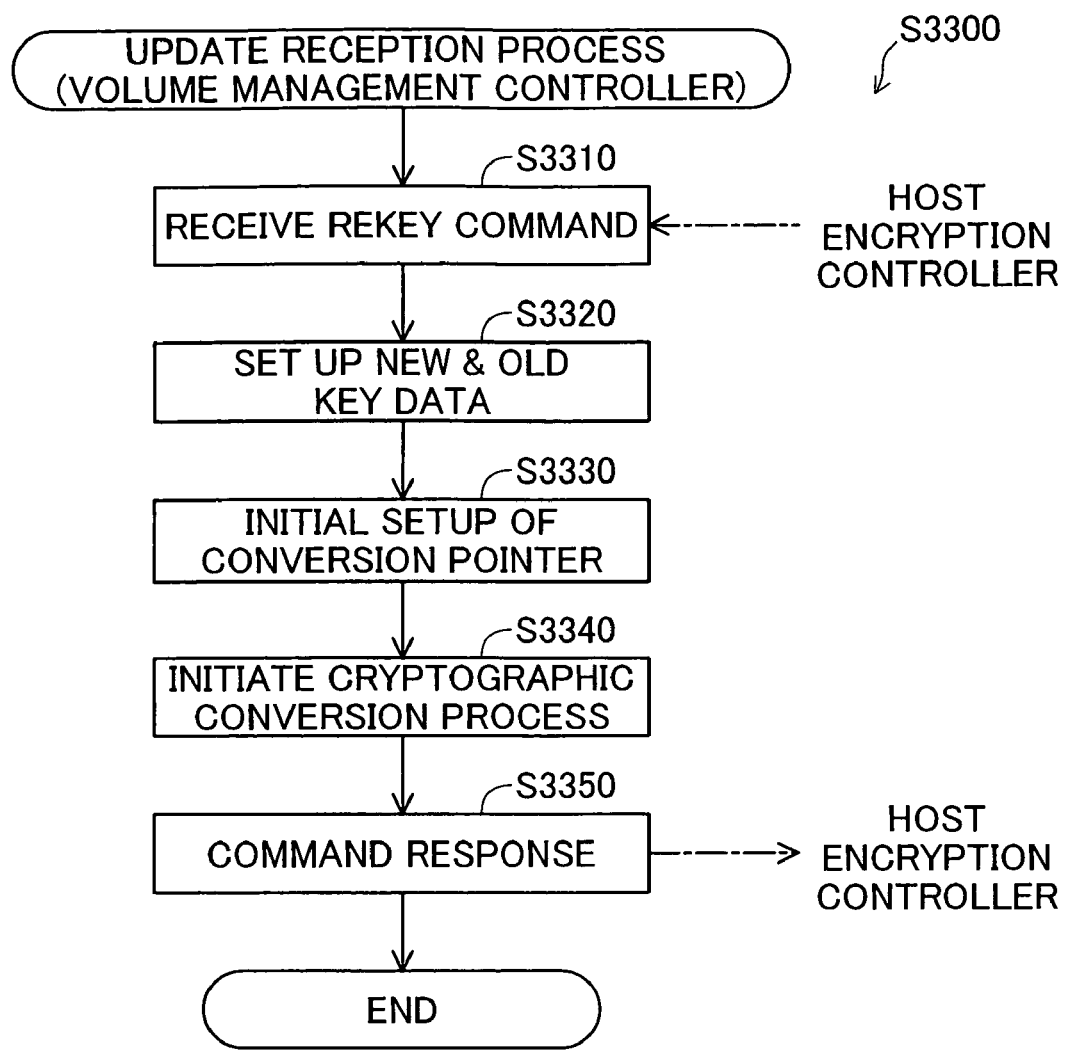
FIG. 7 is a flowchart illustrating an update reception process executed by the volume management controller in the computer system.

FIG. 7 is a flowchart illustrating an update reception process (Step S3300) executed by the volume management controller 314 in the computer system 10. In the present embodiment, the update reception process (Step S3300) of FIG. 7 is implemented through software-controlled operation of the CPU 310 of the storage system 30. In the present embodiment, in the event that a rekey command 910 has been sent from the host encryption controller 214 (Step S2350), the volume management controller 314 will initiate the update reception process (Step S3300) of FIG. 7.

When the volume management controller 314 initiates the update reception process (Step S3300) of FIG. 7, it receives the rekey command 910 from the administrative interface 334 (Step S3310). The volume management controller 314 then places in the memory 320 the old data 901 and the new data 902 contained in the rekey command 910 (Step S3320). Then, by means of storing in a conversion pointer 920 the lead address of a series of block addresses assigned to the volume 390, the volume management controller 314 performs initial setup of the conversion pointer 920 (Step S3330). The volume management controller 314 then initiates a cryptographic conversion process (Step S3400) to be described later (Step S3340). Subsequently, the volume management controller 314 sends the host encryption controller 214 a command response indicating that preparation is complete for modifying the key data (Step S3350).

Figure 8:
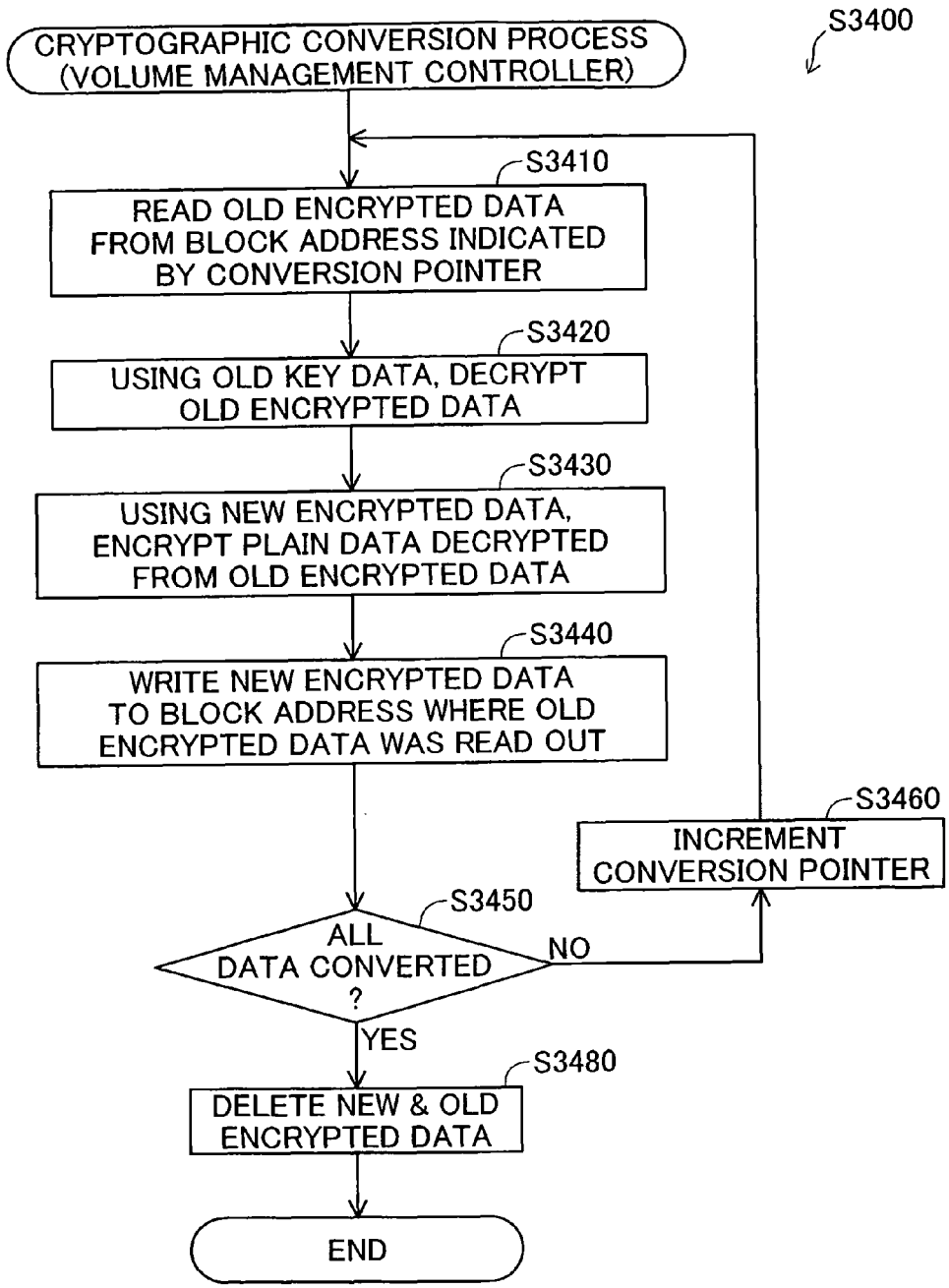
FIG. 8 is a flowchart illustrating a cryptographic conversion process executed by the volume management controller in the computer system.

FIG. 8 is a flowchart illustrating the cryptographic conversion process (Step S3400) executed by the volume management controller 314 in the computer system 10. In the present embodiment, the cryptographic conversion process (Step S3400) of FIG. 8 is implemented through software-controlled operation of the CPU 310 of the storage system 30. In the present embodiment, the volume management controller 314 initiates the cryptographic conversion process (Step S3400) of FIG. 8 when triggered by the update reception process (Step S3340) described previously.

When the volume management controller 314 initiates the cryptographic conversion process (Step S3400) of FIG. 8, the old encrypted data that was encrypted with the old key data 901 is read out from the block address indicated by the conversion pointer 920, from among the series of block addresses assigned to the volume 390 (Step S3410). The volume management controller 314, using the old key data 901 held in the volume management controller 314, then decrypts the old encrypted data that has been read out from the volume 390 (Step S3420). Subsequently, the volume management controller 314, using the new key data 902 held in the volume management controller 314, encrypts the plain data that was decrypted with the old key data 901 (Step S3430). The volume management controller 314 then writes the new encrypted data that was encrypted with the new key data 902, to the original block address from which the old encrypted data was read out (Step S3440).

Subsequently, the volume management controller 314 repeatedly executes (Step S3450) the processes from readout of the old encrypted data to writing of the new encrypted data (Steps S3410-S3440), while incrementing the value of the conversion pointer 920 up to the final address of the volume 390 (Step S3460). When all of the data stored in the volume 390 has been converted from old encrypted data to new encrypted data (Step S3450), the volume management controller 314 deletes the old key data 901 and the new key data 902 from the memory 320 (Step S3480).

Figure 9:
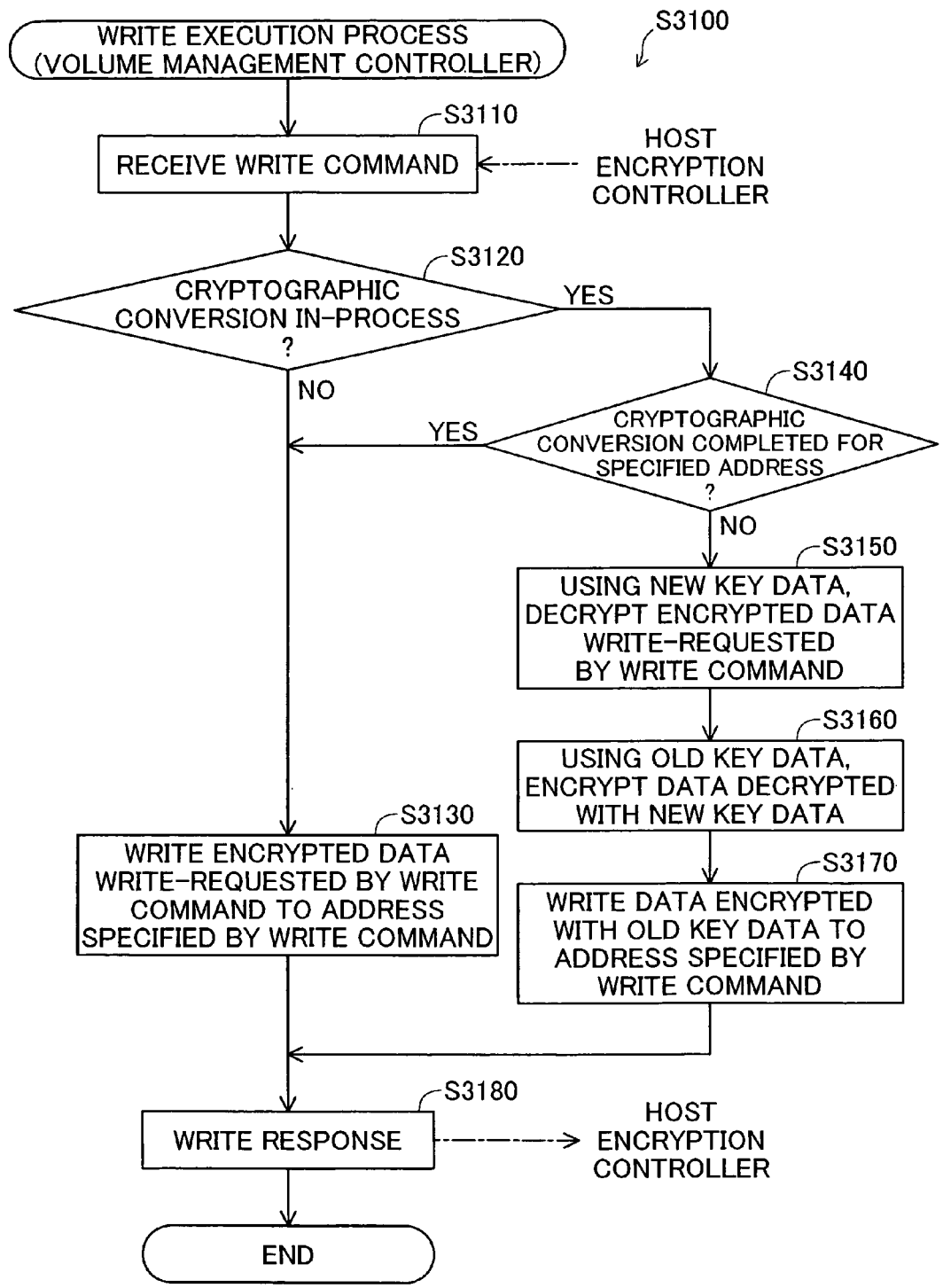
FIG. 9 is a flowchart illustrating a write execution process executed by the volume management controller in the computer system.

FIG. 9 is a flowchart illustrating a write execution process (Step S3100) executed by the volume management controller 314 in the computer system 10. In the present embodiment, the write execution process (Step S3100) of FIG. 9 is implemented through software-controlled operation of the CPU 310 of the storage system 30. In the present embodiment, in the event that a write command is sent from the host encryption controller 214 (Step S2140 of FIG. 4), the volume management controller 314 will initiate the write execution process (Step S3100) of FIG. 9. When the volume management controller 314 initiates the write execution process (Step S3100) of FIG. 9, it receives the write command from the storage interface 332 (Step S3110).

In the event that the cryptographic conversion process discussed previously (FIG. 8, Step S3400) is not in-process at the time that the write command is received, the volume management controller 314 will write the encrypted data included in the write command, to the write address specified in the write command from among the series of block addresses assigned to the volume 390 (Step S3130).

In the event that the cryptographic conversion process discussed previously (FIG. 8, Step S3400) is in-process at the time that the write command is received, and moreover where the write address specified in the write command is an address antecedent to the value of the conversion pointer 920, that is, where encrypted data stored at the write address has already been converted from old encrypted data to new encrypted data (Step S3140), the volume management controller 314 will write the encrypted data included in the write command, to the write address specified in the write command from among the series of block addresses assigned to the volume 390 (Step S3130).

In the event that the cryptographic conversion process discussed previously (FIG. 8, Step S3400) is in-process at the time that the write command is received, and moreover where the write address specified in the write command is an address subsequent to the value of the conversion pointer 920, that is, where encrypted data stored at the write address has not been converted from old encrypted data to new encrypted data (Step S3140), the volume management controller 314 will decrypt the encrypted data contained in the write command, using the new key data 902 held by the volume management controller 314 (Step S3150). Then, using the old key data 901 held by the volume management controller 314, the volume management controller 314 will encrypt the plain data that was decrypted using the new key data 902 (Step S3160). The volume management controller 314 will then write the encrypted data that has been encrypted with the old key data 901, to the write address specified in the write command from among the series of block addresses assigned to the volume 390 (Step S3170).

Once the volume management controller 314 writes the data to the volume 390 on the basis of the write command (Steps S3130, S3170), it sends the host encryption controller 214 a write response indicating that the data has been written to the volume 390 in accordance with the write command (Step S3180).

Figure 10:
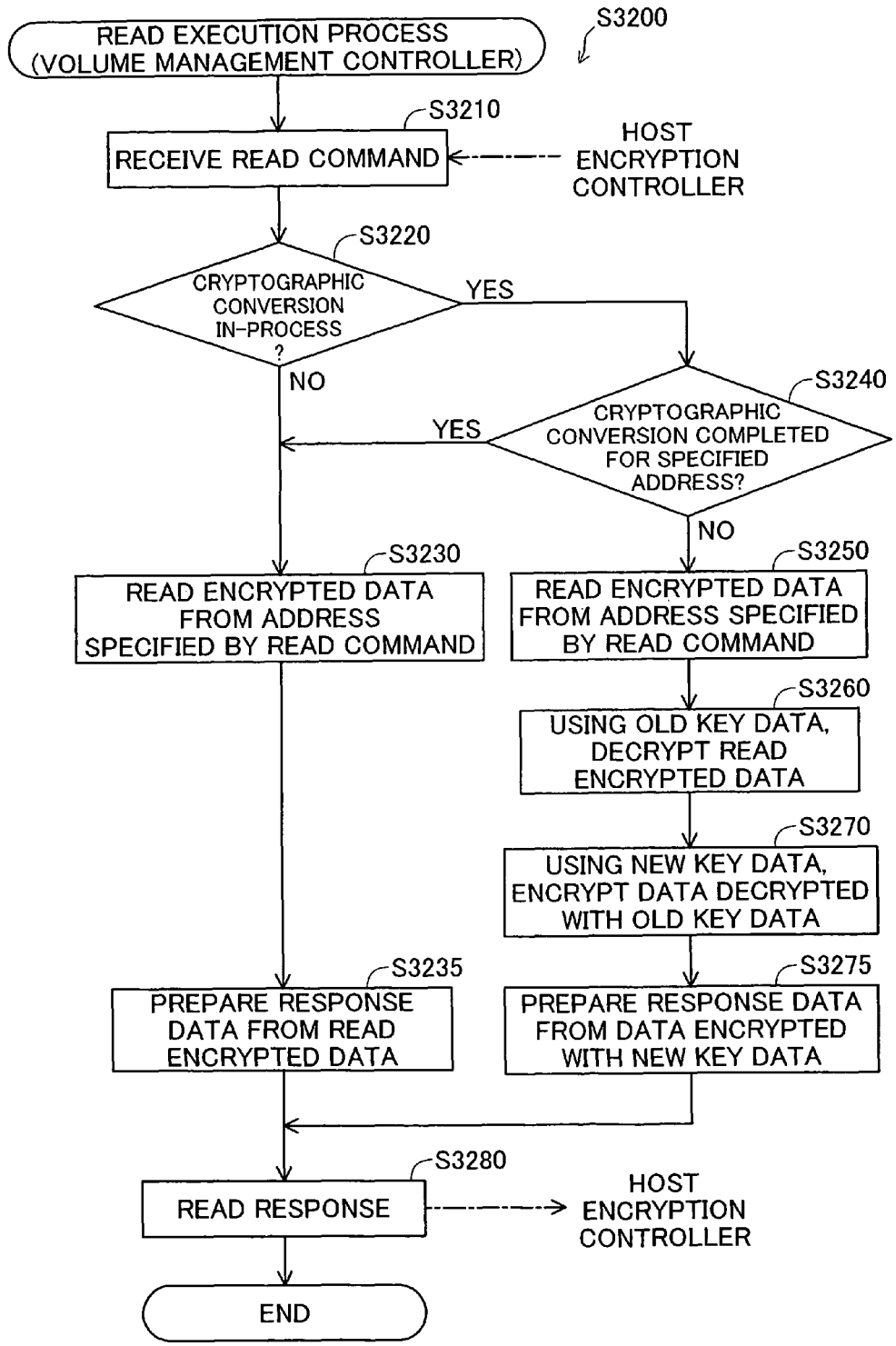
FIG. 10 is a flowchart illustrating a read execution process executed by the volume management controller in the computer system.

FIG. 10 is a flowchart illustrating a read execution process (Step S3200) executed by the volume management controller 314 in the computer system 10. In the present embodiment, the read execution process (Step S3200) of FIG. 10 is implemented through software-controlled operation of the CPU 310 of the storage system 30. In the present embodiment, in the event that a read command is sent from the host encryption controller 214 (Step S2230 of FIG. 5), the volume management controller 314 will initiate the read execution process (Step S3200) of FIG. 10. When the volume management controller 314 initiates the read execution process (Step S3200) of FIG. 10, it receives the read command from the storage interface 332 (Step S3210).

In the event that the cryptographic conversion process discussed previously (FIG. 8, Step S3400) is not in-process at the time that the read command is received, the volume management controller 314 will read the encrypted data from the read address specified by the read command, from among the series of block addresses assigned to the volume 390 (Step S3230). The volume management controller 314 will then use the encrypted data that was read out from the volume 390 on the basis of the read command, to prepare in the cache memory 344 response data for the purpose of responding to the read command (Step S3235).

In the event that the cryptographic conversion process discussed previously (FIG. 8, Step S3400) is in-process at the time that the read command is received, and moreover where the read address specified by the read command is an address antecedent to the value of the conversion pointer 920, that is, where encrypted data stored at the read address has already been converted from old encrypted data to new encrypted data (Step S3240), the volume management controller 314 will read the encrypted data from the read address specified in the read command, from among the series of block addresses assigned to the volume 390 (Step S3230). The volume management controller 314 will then use the encrypted data that was read out from the volume 390 on the basis of the read command, to prepare in the cache memory 344 response data for the purpose of responding to the read command (Step S3235).

In the event that the cryptographic conversion process discussed previously (FIG. 8, Step S3400) is in-process at the time that the read command is received, and moreover where the read address specified by the read command is an address subsequent to the value of the conversion pointer 920, that is, where the encrypted data stored at the write address has not been converted from old encrypted data to new encrypted data (Step S3240), the volume management controller 314 will read out the encrypted data from the read address specified by the read command, from among the series of block addresses assigned to the volume 390 (Step S3250). Then, using the old key data 901 held by the volume management controller 314, the volume management controller 314 will decrypt the encrypted data that was read out from the volume 390 on the basis of the read command (Step S3260). Then, the volume management controller 314, using the new key data 902 held by the volume management controller 314, will encrypt the plain data that was decrypted using the old key data 901 (Step S3270). The volume management controller 314 will then use the encrypted data that was encrypted using the new key data 902 to prepare in the cache memory 344 response data for the purpose of responding to the read command (Step S3275).

Once the volume management controller 314 has read out the data from the volume 390 on the basis of the read command (Steps S3235, S3275), it sends to the host encryption controller 214 a read response containing the response data that was prepared in the cache memory 344 (Step S3280).

A3. Effects:

According to the computer system 10 described hereinabove, encryption/decryption of access data exchanged between the host computer system 20 and the volume 390 is executed on the host computer system 20 end, while in the event that the key data used for encryption/decryption of the access data is to be modified, re-encryption of volume data stored in the volume 390 can be executed on the storage system 30 end. As a result, security against leakage of information can be assured, while also be able to reduce the processing load on the host computer system 20 end in instances where key data is modified.

By means of the write execute process of FIG. 9 (Step S3100), it is possible to avoid a situation where, in response to a write command, volume data stored in the volume 390 is overwritten with data encrypted with new key data, prior to being subjected to the cryptographic conversion process (FIG. 8, Step S3400), and thus during the cryptographic conversion process (FIG. 8, Step S3400) it is possible to easily manage which volume data has been re-encrypted. Moreover, since re-encryption of volume data is carried out sequentially for the series of block addresses (FIG. 8, Step S3460), during the cryptographic conversion process (FIG. 8, Step S3400) it is possible to easily manage which volume data has been re-encrypted.

By means of the read execute process of FIG. 10 (Step S3200), since the host encryption controller 214 can be provided by way of response with data that has been re-encrypted with the new key data 902 even in instances where a read request is for volume data that has yet to be re-encrypted, it is accordingly possible for the cryptographic conversion process (FIG. 8, Step S3400) to be executed on the storage system 30 end, while at the same time handling read access from the host computer system 20.

Moreover, when the cryptographic conversion process (FIG. 8, Step S3400) has been completed, the old key data 901 and the new key data 902 are deleted from the storage system 30 end (FIG. 8, Step S3480), whereby security against leakage of information from the storage system 20 can be improved.

B. Embodiment 2

Figure 11:
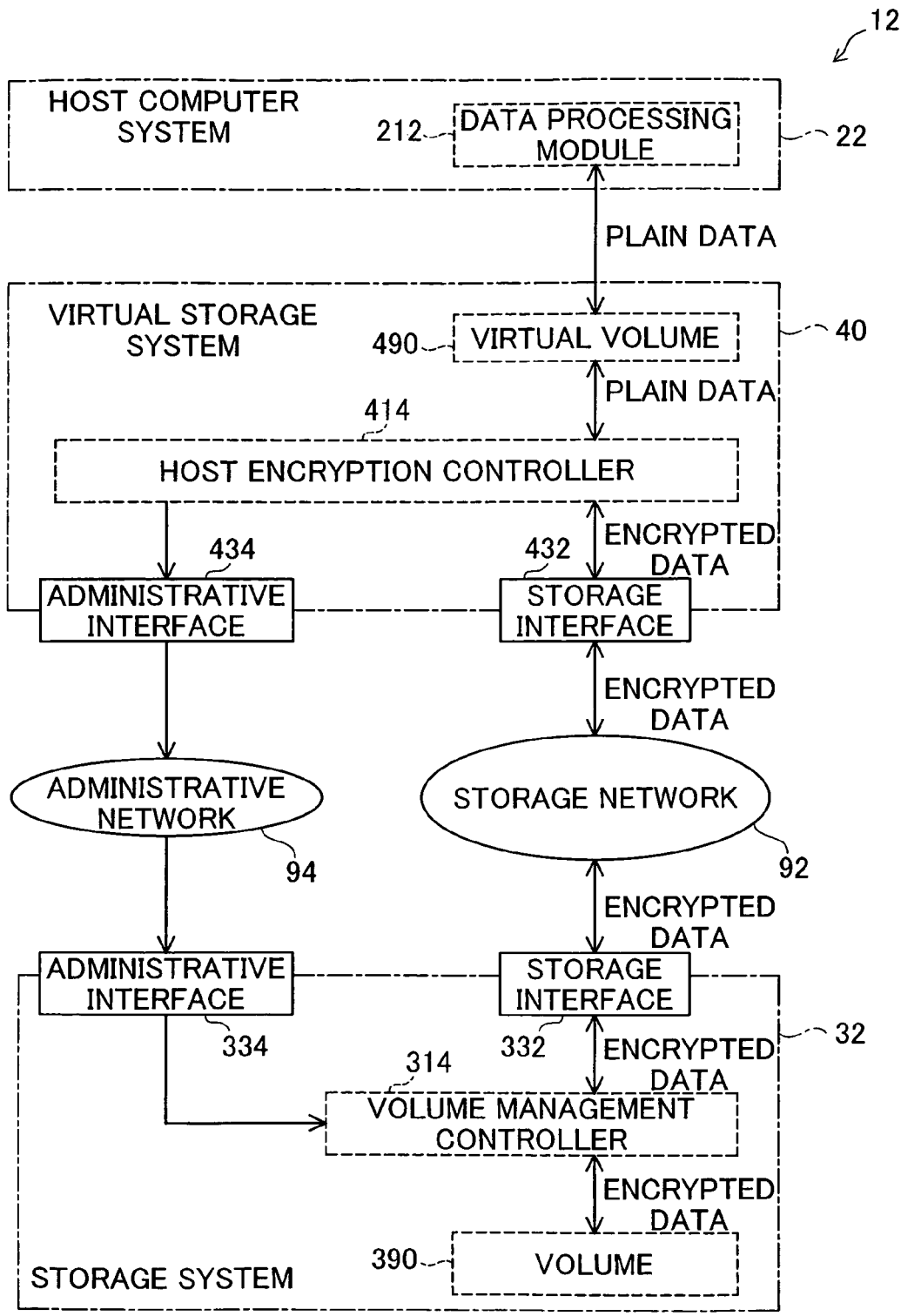
FIG. 11 is an illustration depicting functionally a simplified configuration of a computer system in Embodiment 2.

FIG. 11 is an illustration depicting functionally a simplified configuration of a computer system 12 in Embodiment 2. The computer system 12 of Embodiment 2 is similar to the computer system 10 in Embodiment 1, except that the host computer system 20 is replaced by a host computer system 22 and a virtual storage system 40; and the storage system 30 is replaced by a storage system 32. The host computer system 22 of the computer system 12 is similar to the host computer system 20 in Embodiment 1, except for lacking the functionality of the host encryption controller 214. The storage system 32 of the computer system 12 is similar to the storage system 30 in Embodiment 1, except that the volume 390 is configured to be accessible indirectly from the host computer system 22, through the virtual storage system 40.

The virtual storage system 40 of the computer system 12 employs a storage system by way of one example of a virtual device constituting a virtual volume that is accessible indirectly by the host computer system; as another embodiment, a switch could be used in place of the virtual storage system 40 as the virtual device. The virtual storage system 40 is furnished with a virtual volume 490 and a host encryption controller 414. The virtual volume 490 of the virtual storage system 40 is a volume created virtually by means of association with the volume 390 of the storage system 32, and is accessible from the data processing module 212 of the host computer system 20. The host encryption controller 414 of the virtual storage system 40 is similar to the host encryption controller 214 in Embodiment 1: it holds key data used for data encryption and decryption, and performs encoding of data for writing from the data processing module 212 to the volume 390 through the virtual volume 490, as well as performing decryption of data read from the volume 390 by the data processing module 212 through the virtual volume 490. By means of this configuration, on the access path leading from the data processing module 212 through the virtual volume 490 and on to the volume 390 via the storage network 92, unencrypted plain data is exchanged on the data processing module 212 side of the host encryption controller 414, while encrypted data is exchanged on the volume 390 side of the host encryption controller 414.

The virtual storage system 40 is furnished with a computer having a CPU and memory; a storage interface 432 for exchange of data with the storage system 30 via the storage network 92; and an administrative interface 434 for exchange of data with the storage system 30 via the administrative network 94. The virtual volume 490 and the host encryption controller 414 of the virtual storage system 40 are implemented through operation of the CPU of the virtual storage system 40 in accordance with software, using the memory.

According the computer system 12 of Embodiment 2 described hereinabove, in a system configuration with a host encryption controller 414 furnished to a virtual storage system 40 that provides the host computer system 22 with a virtual volume 490, it is possible to reduce the processing load on the virtual storage system 40 in instances where the key data is changed, while ensuring security against leakage of information.

C. Embodiment 3

Figure 12:
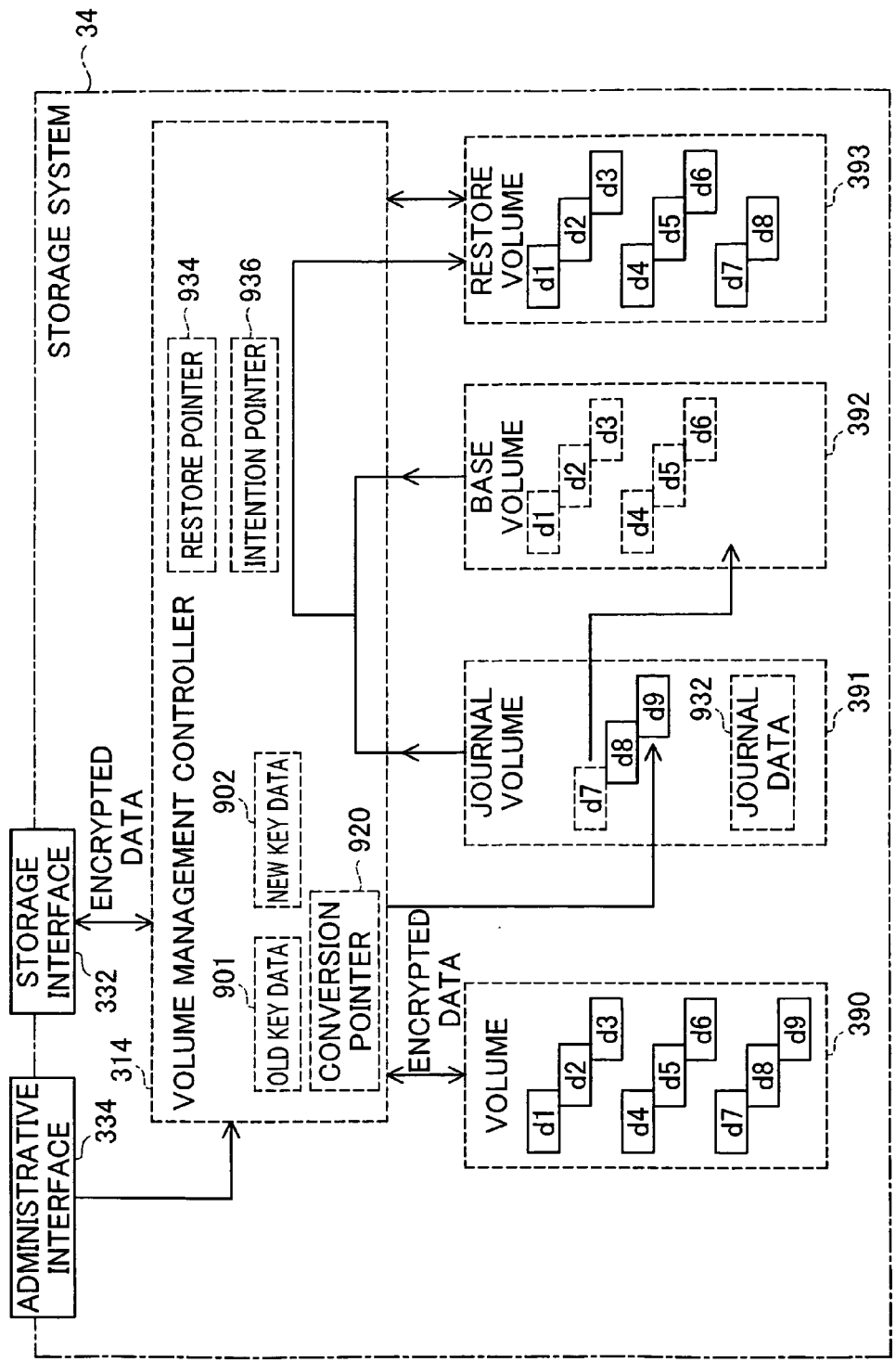
FIG. 12 is an illustration depicting functionally a simplified configuration of a storage system in Embodiment 3.

FIG. 12 is an illustration depicting functionally a simplified configuration of a storage system 34 in Embodiment 3. The computer system of Embodiment 3 is similar to the computer system 10 in Embodiment 1, except that the storage system 30 is replaced by the storage system 34.

The storage system 34 in Embodiment 3 has a configuration like the storage system 30 in Embodiment 1, further having a base volume 392 for storing a copy of data stored in the volume 390 at a predetermined period in time, in order to execute Continuous Data Protection (CDP); and with a journal volume 391 for saving a copy of data that was written to the volume 390 at some point in time after a predetermined set time stored in the base volume 392. The journal volume 391 of the storage system 34 holds journal data 931 capable of identifying the date and time that data was written to the volume 390 after the set time.

The volume management controller 314 of the storage system 34 in Embodiment 3 executes processes similar to those in Embodiment 1; additionally, upon receiving from the administrative interface 334 a restore command instructing it to configure a restore volume 393 for the purpose of restoring the volume 390 at an intended point in time after the set time, the volume management controller 314 proceeds to configure the restore volume 393 from data stored in the journal volume 391 and the base volume 392. The volume management controller 314 in Embodiment 3 uses a restore pointer 391 to identify the data to be copied either from the journal volume 391 or the base volume 392. If there are any data with the same address of the restore pointer 394 in the journal volume 391, the latest data among them is chosen as the data to be recovered. Otherwise the data with the same address of the restore pointer 394 in the base volume 392 is chosen as the data to be recovered. In the present embodiment, the journal volume 391, the base volume 392, and the restore volume 393 are logically configured by means of management of the plurality of HDD 350 by RAID technology, by the CPU 310 in accordance with the storage configuration program 382 using the memory 320.

Figure 13:
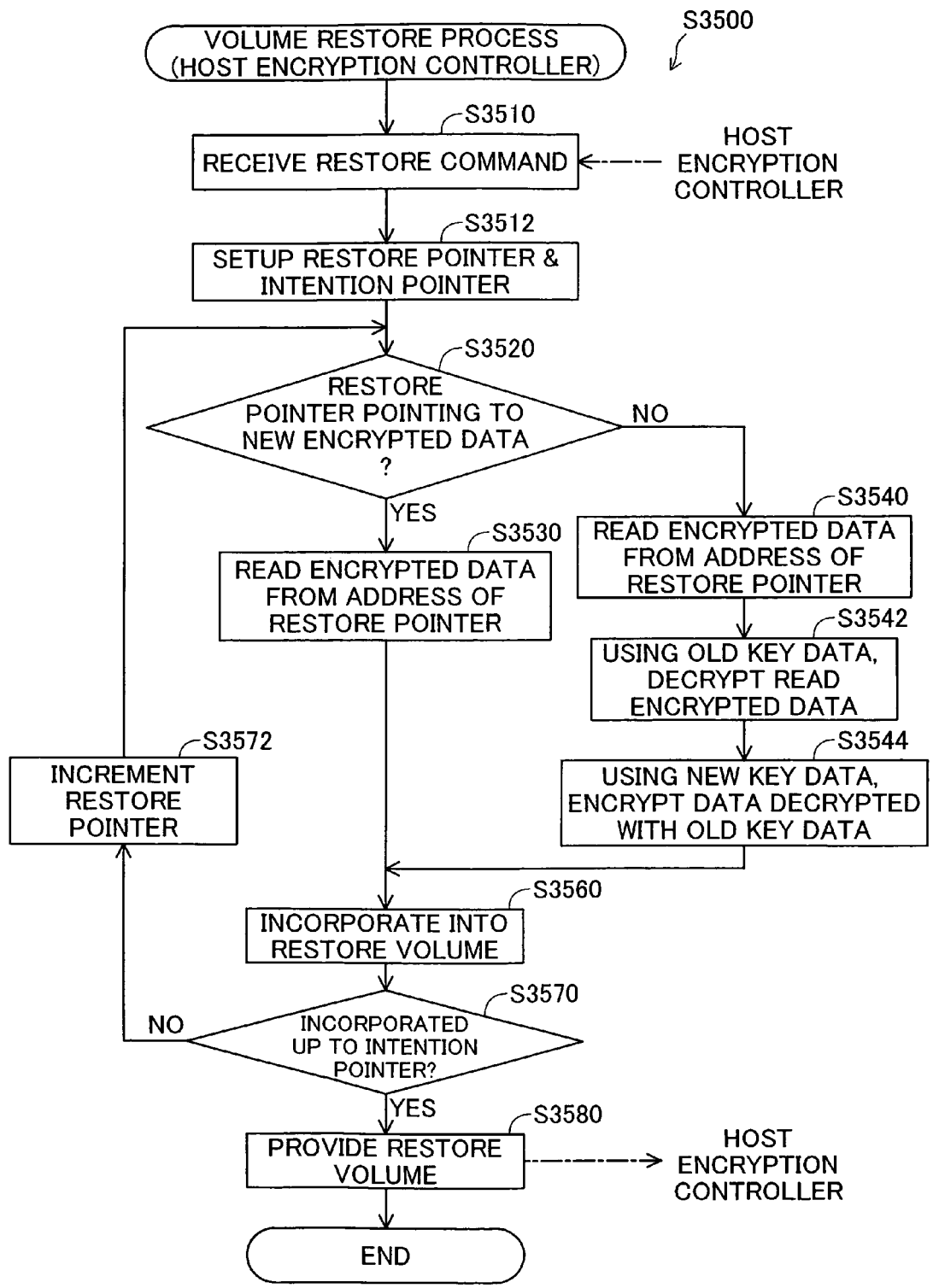
FIG. 13 is a flowchart depicting a volume restore process executed by the volume management controller in Embodiment 3.

FIG. 13 is a flowchart depicting a volume restore process (Step S3500) executed by the volume management controller 314 in Embodiment 3. In the present embodiment, the volume restore process (Step S3500) of FIG. 13 is implemented through software-controlled operation of the CPU 310 of the storage system 34. In the present embodiment, in the event that a restore command is sent from the host encryption controller 214, the volume management controller 314 will initiate the volume restore process (Step S3500) of FIG. 13.

When the volume management controller 314 initiates the volume restore process (Step S3500) of FIG. 13, it receives the restore command from the administrative interface 334 (Step S3510). The volume management controller 314 then performs initial setup of the restore pointer 934 in the memory 320, as well as setup in the memory 320 of the intention pointer 936 which indicates the desired point in time specified by the restore command (Step S3512).

In the event that new encrypted data is stored at the block address corresponding to the restore pointer 934 in the base volume 392 and the journal volume 391 (Step S3520), the volume management controller 314 will read the new encrypted data from the block address (Step S3530) and incorporate this new encrypted data into the restore volume 393 (Step S3560).

On the other hand, if old encrypted data is stored at the block address corresponding to the restore pointer 934 in the base volume 392 and the journal volume 391 (Step S3520), the volume management controller 314 will read the old encrypted data from the block address (Step S3540). The volume management controller 314 will then decode the old encrypted data using the old key data 901 held by the volume management controller 314 (Step S3542). Then, using the new key data 902 held by the volume management controller 314, the volume management controller 31, will encrypt the plain data that was decrypted with the old key data 901 (Step S3544), and incorporate into the restore volume the encrypted data that has been encrypted with the new key data 902 (Step S3560).

After the data at the block address corresponding to the restore pointer 934 has been incorporated into the restore volume 393 (Step S3560), the volume management controller 314 repeatedly executes (Step S3570) the processes from readout of data corresponding to the restore pointer 934 up through incorporation thereof into the restore volume 393 (Steps S3520-3560), while incrementing the value of the restore pointer 934 up to the value of the intention pointer 936 (Step S3572). Once the data from block addresses up through that corresponding to the intention pointer 936 has been incorporated into the restore volume 393 (Step S3570), the volume management controller 314 provides the restore volume 393 to the host encryption controller 214 (Step S3580).

In the example of FIG. 12, the base volume 392 has stored therein data d1-d6 as old encrypted data, while the journal volume 391 has stored therein data d7 as old encrypted data, as well as data d8, d9 as new encrypted data. Starting from this condition, where the restore volume 393 having the data d1-d8 stored therein is configured, the data d1-d6 of the base volume 392 and the data d7 of the journal volume 391 will be converted from old encrypted data to new encrypted data, then incorporated into the restore volume 393 (Steps S3540-S3560 of FIG. 13). The remaining data d8 of the journal volume 391 will be incorporated as-is into the restore volume 393 (Steps S3530, S3560 of FIG. 13).

According to the computer system in Embodiment 3 discussed hereinabove, the cryptographic conversion process (FIG. 8, Step S3400) can be executed in the storage system 34, while implementing Continuous Data Protection (CDP) in the storage system.

D. Embodiment 4

Figure 14:
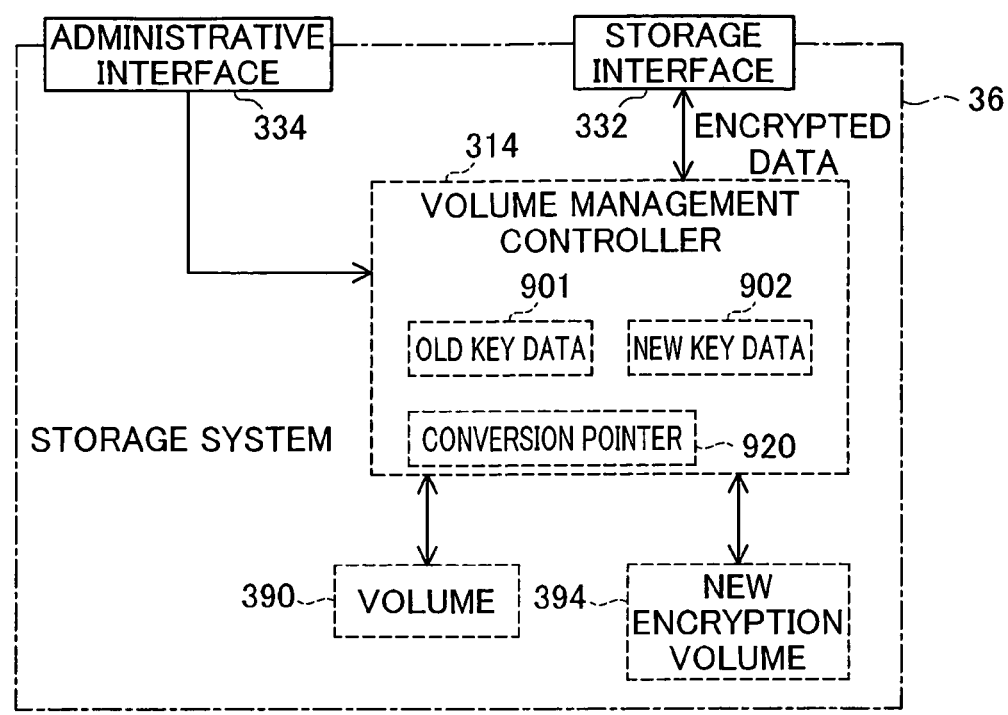
FIG. 14 is an illustration depicting functionally the storage system in Embodiment 4.

FIG. 14 is an illustration depicting functionally the storage system 36 in Embodiment 4. The computer system of Embodiment 4 is similar to the computer system 10 in Embodiment 1, except that the storage system 30 is replaced by the storage system 36.

The storage system 36 in Embodiment 4 is configured like the storage system 30 in Embodiment 1, but is additionally furnished with a new encryption volume 394 to which are assigned a series of block addresses shared with the volume 390; in the event that a rekey command 910 is sent from the host encryption controller 214, data stored in the volume 390 will be encrypted with the new key data 902, and the encrypted data then stored in the new encryption volume 394.

Figure 15:
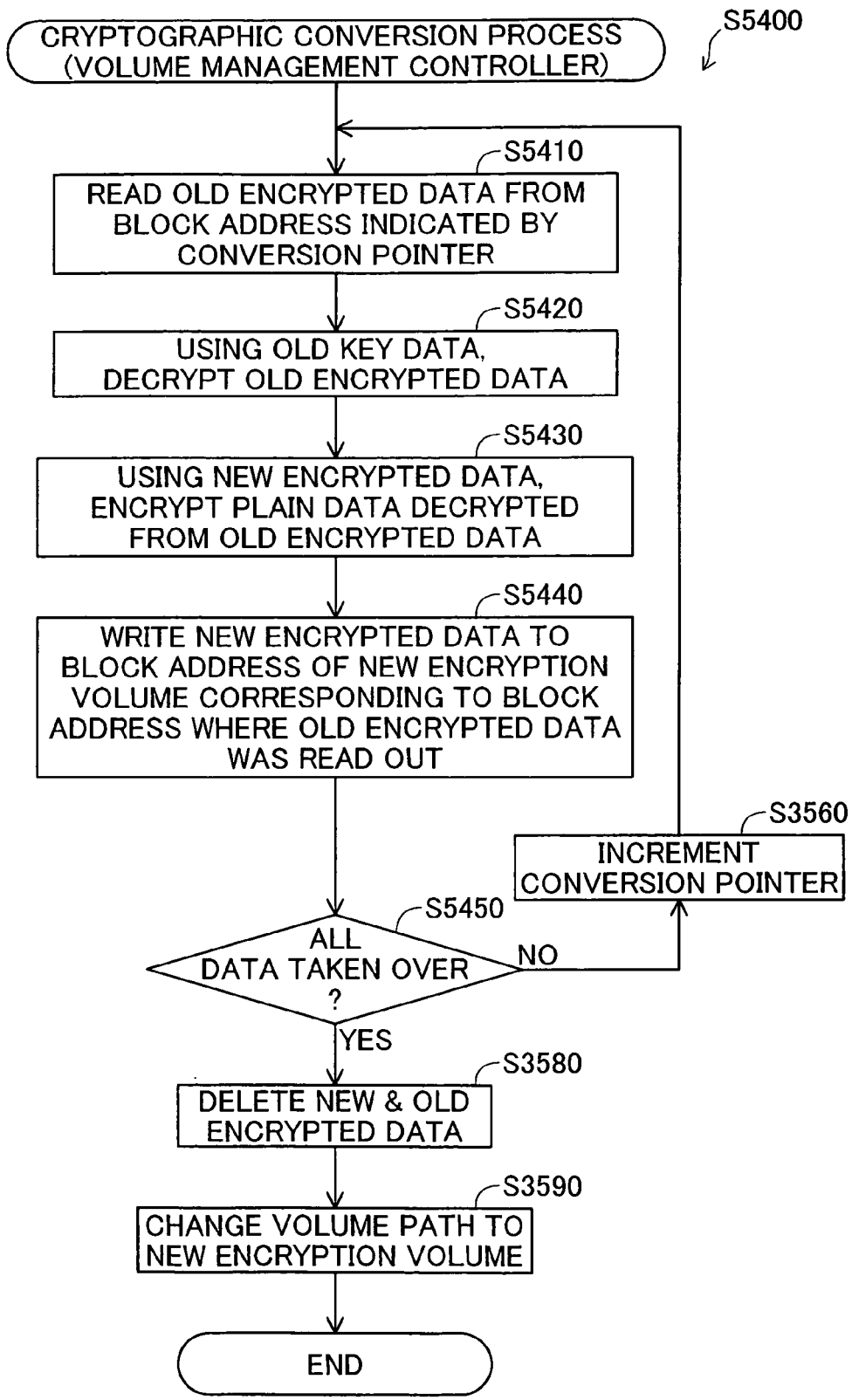
FIG. 15 is a flowchart of a cryptographic conversion process executed by the volume management controller in Embodiment 4.

FIG. 15 is a flowchart of a cryptographic conversion process (Step S5400) executed by the volume management controller 314 in Embodiment 4. The volume management controller 314 in Embodiment 4 executes the cryptographic conversion process of FIG. 15 (Step S5400) instead of the cryptographic conversion process of FIG. 8 (Step S3400). In the present embodiment, the cryptographic conversion process of FIG. 15 (Step S5400) is implemented through software-controlled operation of the CPU 310 of the storage system 30. In the present embodiment, the volume management controller 314 initiates the cryptographic conversion process of FIG. 15 (Step S5400) when triggered by the update reception process (Step S3340) described previously.

When the volume management controller 314 initiates the cryptographic conversion process of FIG. 15 (Step S5400), the old encrypted data that was encrypted with the old key data 901 is read out from the block address of the volume 390 indicated by the conversion pointer 920 (Step S5410). The volume management controller 314, using the old key data 901 held in the volume management controller 314, then decrypts the old encrypted data that has been read out from the volume 390 (Step S5420). Subsequently, the volume management controller 314, using the new key data 902 held in the volume management controller 314, encrypts the plain data that was decrypted with the old key data 901 (Step S5430). The volume management controller 314 then writes the new encrypted data that was encrypted with the new key data 902, to a block address in the new encryption volume 394, corresponding to the block address of the volume 390 from which the old encrypted data was read out (Step S5440).

Subsequently, the volume management controller 314 repeatedly executes (Step S5450) the processes from readout of the old encrypted data to writing of the new encrypted data (Steps S5410-S5440), while incrementing the value of the conversion pointer 920 up to the final address of the volume 390 (Step S5460). When all of the data stored in the volume 390 has been converted from old encrypted data to new encrypted data and migrated to the new encryption volume 394 (Step S5450), the volume management controller 314 deletes the old key data 901 and the new key data 902 from the memory 320 (Step S3580). The volume management controller 314 then switches the destination volume specified by the connection path for the host encryption controller 214, from the volume 390 to the new encryption volume 394 (Step S3590).

Figure 16:
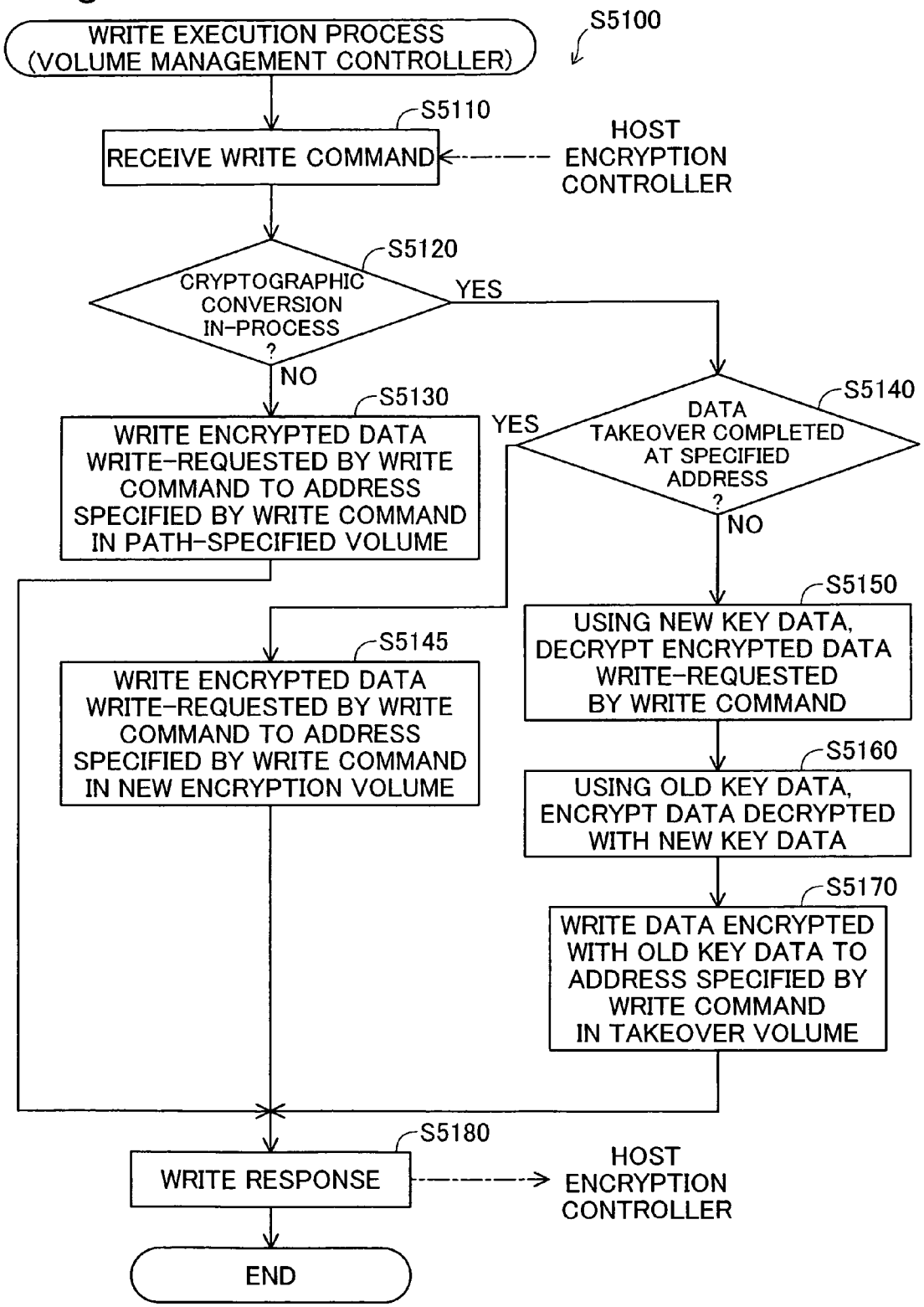
FIG. 16 is a flowchart illustrating a write execution process executed by the volume management controller in Embodiment 4.

FIG. 16 is a flowchart illustrating a write execution process (Step S5100) executed by the volume management controller 314 in Embodiment 4. The volume management controller 314 in Embodiment 4 executes the write execution process of FIG. 16 (Step S5100) instead of the write execution process (Step S3100) of FIG. 9. In the present embodiment, the write execution process of FIG. 16 (Step S5100) is implemented through software-controlled operation of the CPU 310 of the storage system 30. In the present embodiment, in the event that a write command is sent from the host encryption controller 214 (Step S2140 of FIG. 4), the volume management controller 314 will initiate the write execution process of FIG. 16 (Step S5100). When the volume management controller 314 initiates the write execution process of FIG. 16 (Step S5100), it receives the write command from the storage interface 332 (Step S5110).

In the event that the cryptographic conversion process discussed previously (FIG. 15, Step S5400) is not in-process at the time that the write command is received, the volume management controller 314 will write the encrypted data included in the write command, to the write address specified in the write command from among the block addresses in the destination volume specified by the connection path for the host encryption controller 214 (Step S5130).

In the event that the cryptographic conversion process discussed previously (FIG. 15, Step S5400) is in-process at the time that the write command is received, and moreover where the write address specified in the write command is an address antecedent to the value of the conversion pointer 920, that is, where encrypted data stored at the write address has already been taken over from the volume 390 by the new encryption volume 394 (Step S5140), the volume management controller 314 will write the encrypted data included in the write command, to the write address specified in the write command from among the block addresses in the new encryption volume 394 (Step S5145).

In the event that the cryptographic conversion process discussed previously (FIG. 15, Step S5400) is in-process at the time that the write command is received, and moreover where the write address specified in the write command is an address subsequent to the value of the conversion pointer 920, that is, where encrypted data stored at the write address has not been taken over from the volume 390 by the new encryption volume 394 (Step S5140), the volume management controller 314 will decrypt the encrypted data contained in the write command, using the new key data 902 held by the volume management controller 314 (Step S5150). Then, using the old key data 901 held by the volume management controller 314, the volume management controller 314 will encrypt the plain data that was decrypted using the new key data 902 (Step S5160). The volume management controller 314 will then write the encrypted data that has been encrypted with the old key data 901, to the write address specified in the write command, from among the block addresses in the volume 390 (Step S5170).

Once the volume management controller 314 has written data to the volume 390 or to the new encryption volume 394 on the basis of the write command (Steps S5130, S5145 and S5170), it sends the host encryption controller 214 a write response indicating that the data has been written in accordance with the write command (Step S5180).

Figure 17:
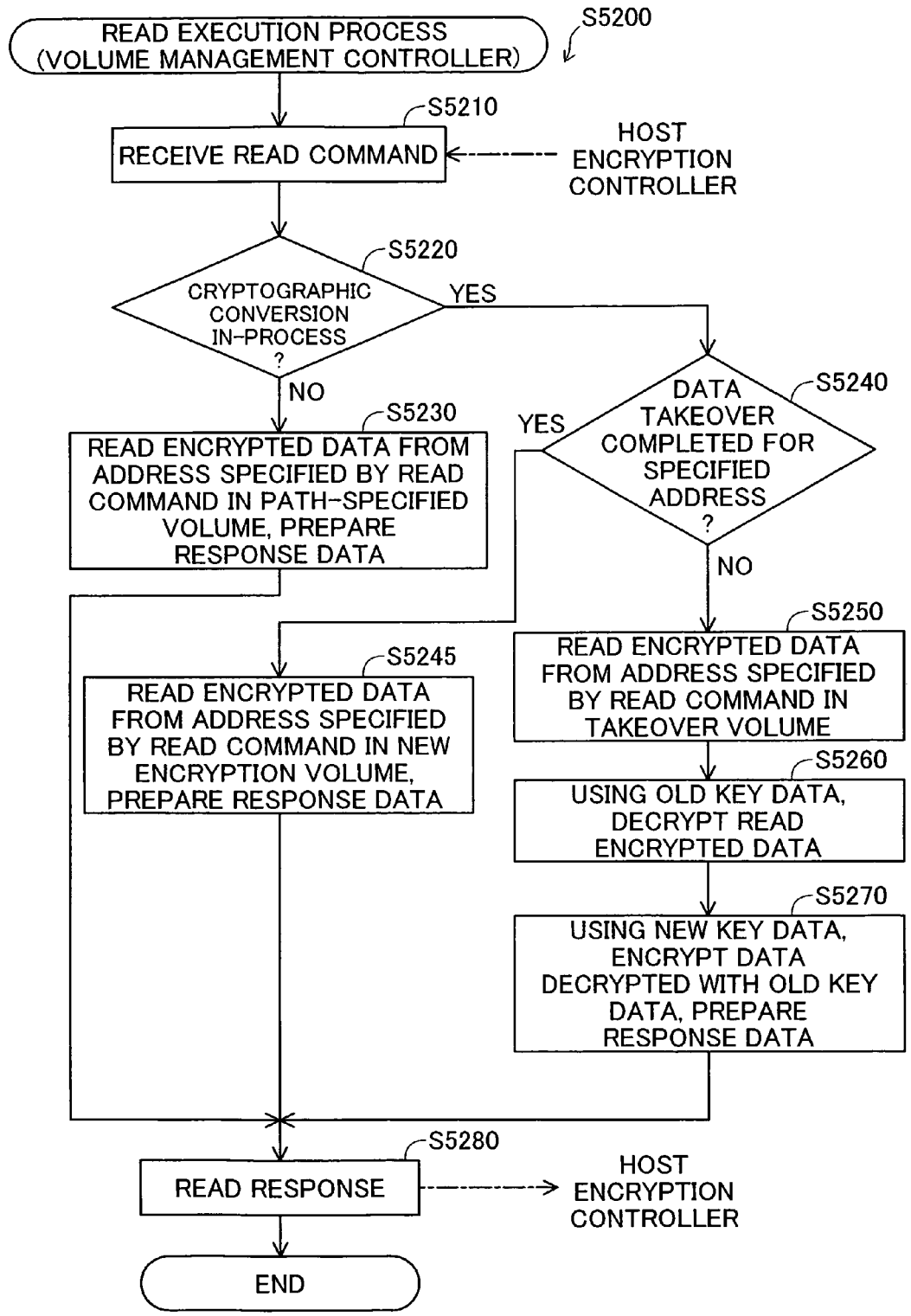
FIG. 17 is a flowchart illustrating a read execution process executed by the volume management controller in Embodiment 4.

FIG. 17 is a flowchart illustrating a read execution process (Step S5200) executed by the volume management controller 314 in Embodiment 4. In Embodiment 4, the volume management controller 314 executes the read execution process of FIG. 17 (Step S5200) instead of the read execution process of FIG. 10 (Step S3200). In the present embodiment, the read execution process of FIG. 17 (Step S5200) is implemented through software-controlled operation of the CPU 310 of the storage system 30. In the present embodiment, in the event that a read command is sent from the host encryption controller 214 (Step S2230 of FIG. 5), the volume management controller 314 will initiate the read execution process of FIG. 17 (Step S5200). When the volume management controller 314 initiates the read execution process of FIG. 17 (Step S5200), it receives the read command from the storage interface 332 (Step S5210).

In the event that the cryptographic conversion process discussed previously (FIG. 15, Step S5400) is not in-process at the time that the read command is received, the volume management controller 314 will read the encrypted data from the read address specified by the read command, from among the block addresses in the destination volume specified by the connection path for the host encryption controller 214, and using the encrypted data will prepare in the cache memory 344 response data for the purpose of responding to the read command (Step S5230).

In the event that the cryptographic conversion process discussed previously (FIG. 15, Step S5400) is in-process at the time that the read command is received, and moreover where the read address specified by the read command is an address antecedent to the value of the conversion pointer 920, that is, where encrypted data stored at the read address has already been taken over from the volume 390 by the new encryption volume 394 (Step S5240), the volume management controller 314 will read the encrypted data from the read address specified by the read command, from among the block addresses in the new encryption volume 394, and use the encrypted data to prepare in the cache memory 344 response data for the purpose of responding to the read command (Step S5245).

In the event that the cryptographic conversion process discussed previously (FIG. 15, Step S5400) is in-process at the time that the read command is received, and moreover where the read address specified by the read command is an address subsequent to the value of the conversion pointer 920, that is, where encrypted data stored at the read address has not been taken over from the volume 390 by the new encryption volume 394 (Step S5240), the volume management controller 314 will read the encrypted data from the read address specified by the read command, from among the block addresses in the volume 390 (Step S5250). Then, using the old key data 901 held by the volume management controller 314, the volume management controller 314 will decrypt the encrypted data that was read out from the volume 390 on the basis of the read command (Step S5260). Then, the volume management controller 314, using the new key data 902 held by the volume management controller 314, will encrypt the plain data that was decrypted using the old key data 901, and use the encrypted data to prepare in the cache memory 344 response data for the purpose of responding to the read command (Step S5270).

Once the volume management controller 314 has read out the data from the volume 390 or the new encryption volume 394 on the basis of the read command (Steps S5230, S5245 and 5270), it sends to the host encryption controller 214 a read response containing the response data that was prepared in the cache memory 344 (Step S5280).

According to the computer system in Embodiment 4 discussed above, data is duplicated to both the volume 390 and the new encryption volume 394, and therefore loss of data during the cryptographic conversion process (FIG. 15, Step S5400) can be prevented. Moreover, by means of the write execution process of FIG. 16 (Step S5100), in the event of a request to write to a block address containing data that has not yet taken over from the volume 390 by the new encryption volume 394, the data of the write request will be encrypted with the old key data 901 for writing to the volume 390, whereby data may be taken over from the volume 390 by the new encryption volume 394 while handing write access from the host computer system 20. Furthermore, by means of the read execution process of FIG. 17 (Step S5200), in the event of a request to read volume data that has yet not been taken over by the new encryption volume 394, the host computer system 20 can be provided in response with data that has been re-encrypted with new key data 902, whereby the cryptographic conversion process FIG. 15, Step S5400) can be executed while handling read access from the host computer system 20.

E. Embodiment 5

Figure 18:
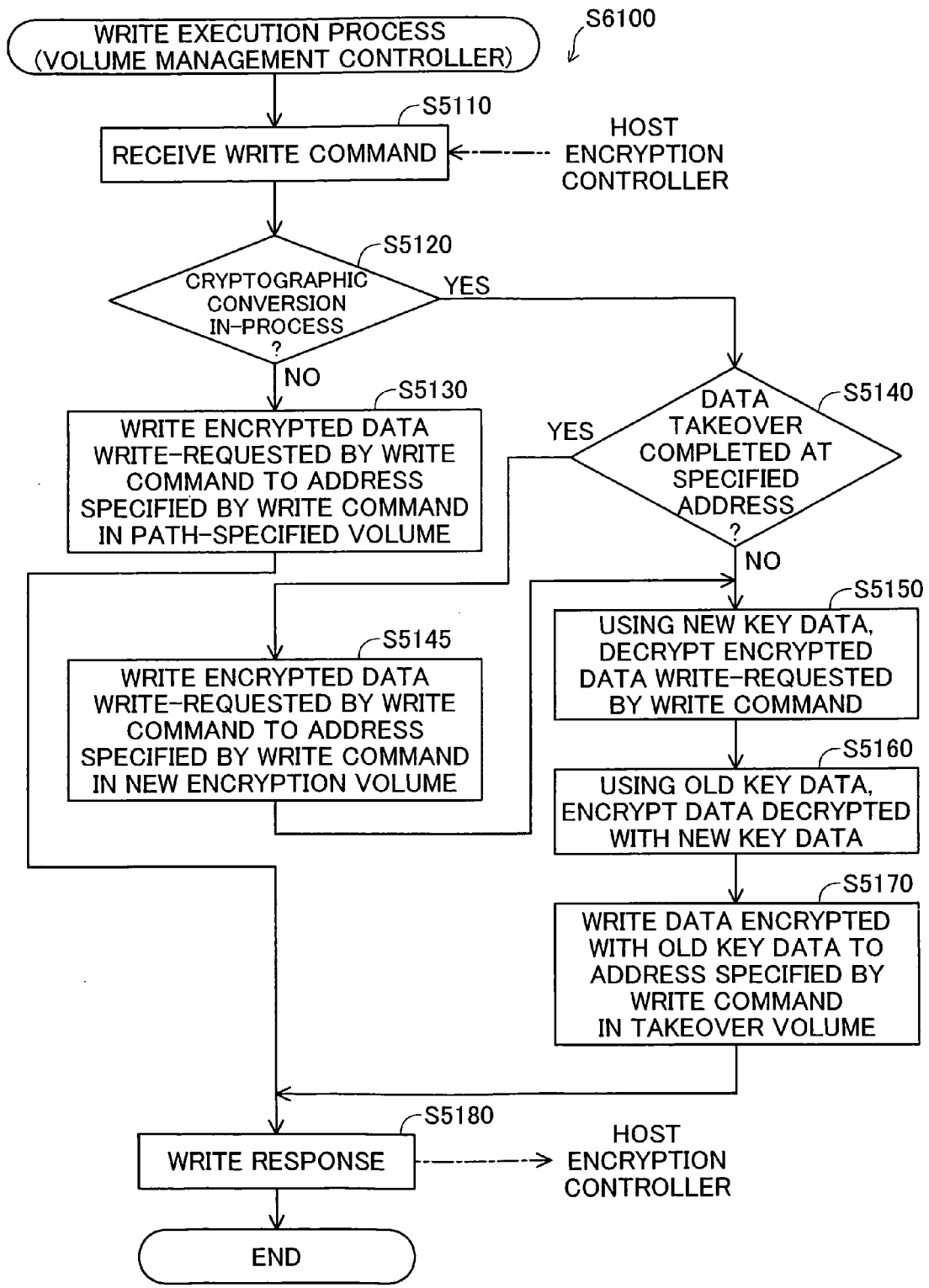
FIG. 18 is a flowchart illustrating a write execution process executed by the volume management controller in Embodiment 5.

FIG. 18 is a flowchart illustrating a write execution process (Step S6100) executed by the volume management controller 314 in Embodiment 5. The computer system in Embodiment 5 is similar to the computer system in Embodiment 4, except that the write execution process of FIG. 18 (Step S61100) is executed instead of the write execution process of FIG. 16 (Step S5100). The write execution process of FIG. 18 (Step S6100) is similar to the write execution process of FIG. 16 (Step S5100), except that in the event that encrypted data stored at a write address has been taken over from the volume 390 by the new encryption volume 394 (Step S5140), after writing the encrypted data contained in the write command to the new encryption volume 394 (Step S5145), the encrypted data contained in the write command will additionally be encrypted with the old key data 901, and written to the volume 390 (Steps S5150, S5160 and S5170).

According to Embodiment 5 discussed above, in the event of a request to write to a block address containing data that has not yet been taken over from the volume 390 by the new encryption volume 394, the data of the write request will be encrypted with the old key data 901 and written to the volume 390, whereby data can be taken over from the volume 390 by the new encryption volume 394, while handling write access from the host computer system 20.

F. Embodiment 6

Figure 19:
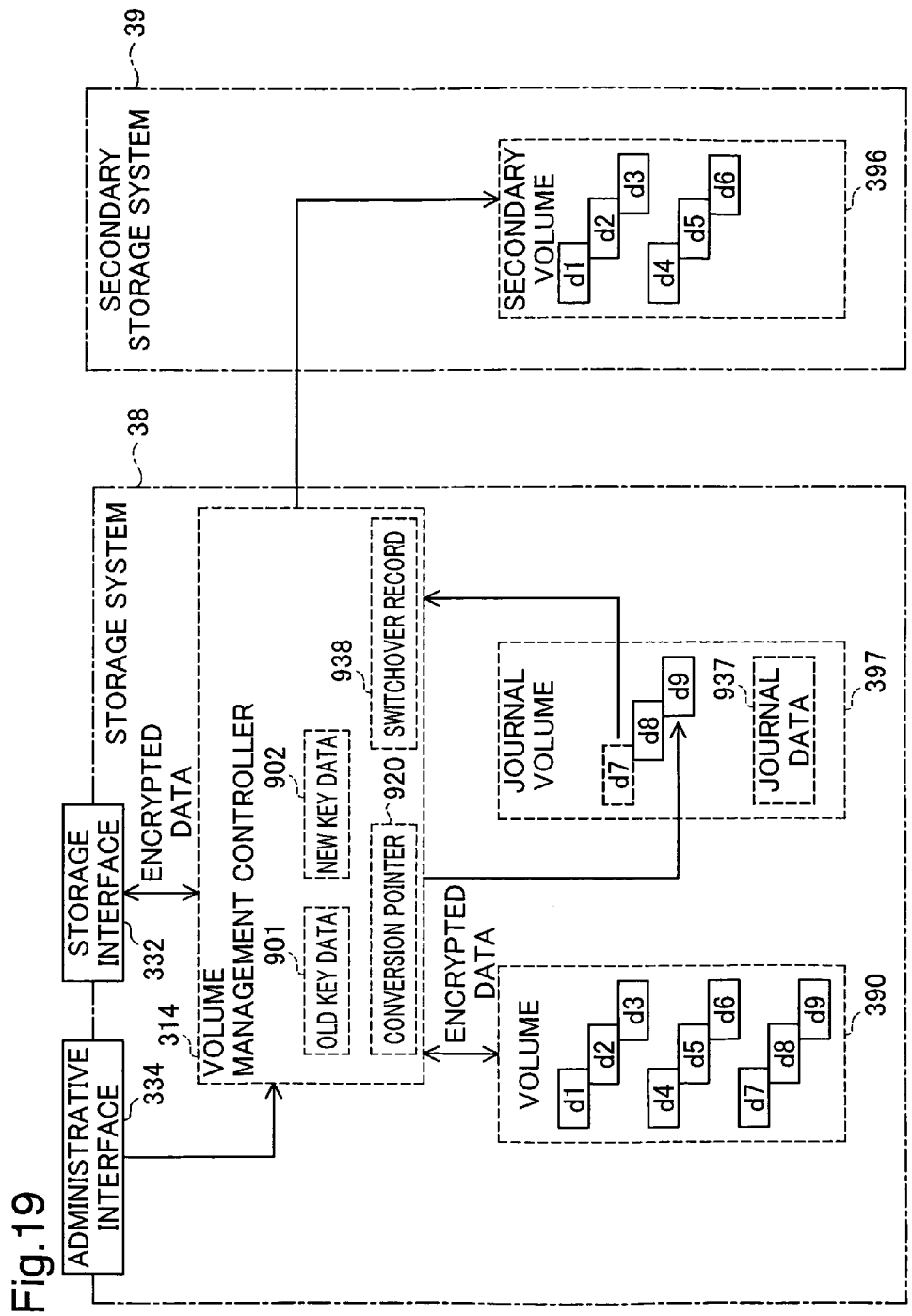
FIG. 19 is an illustration depicting functionally a storage system and a secondary storage system in Embodiment 6.

FIG. 19 is an illustration depicting functionally a storage system 38 and a secondary storage system 39 in Embodiment 6. The computer system in Embodiment 6 is similar to the computer system 10 in Embodiment 1, except that the storage system 38 and the secondary storage system 39 are provided in place of the storage system 30. In the present embodiment, the secondary storage system 39 is located at a different site from the storage system 38, and remote copy, whereby data stored in the storage system 38 is copied asynchronously to the secondary storage system 39, is implemented. The secondary storage system 39 has a secondary volume 396 that is assigned a series of block addresses associated with the storage system 38.

The storage system 38 in Embodiment 6 is configured like the storage system 30 in Embodiment 1, but is additionally furnished with a journal volume 397 for saving a copy (record) of data written to the volume 390. The journal volume 397 of the storage system 38 holds journal data 937 capable of specifying the processing order in which data was written to the volume 390.

The volume management controller 314 of the storage system 38 in Embodiment 6 executes processes similar to those in Embodiment 1, as well as a process of copying data that is written to the volume 390, temporarily storing a copy of the data in the form of a record in the journal volume 397, then transferring the record of the journal volume 397 to the secondary volume 396 according to the processing order specified by the journal data 397. In the present embodiment, a record transferred to the secondary volume 396 is then deleted from the journal volume 397. In the present embodiment, in the event that a rekey command 910 is sent from the host encryption controller 214, the volume management controller 314 in Embodiment 6 will set up in the memory 320 a switchover record 938 that indicates a record of the data initially written thereafter to the volume 390. In the present embodiment, journal volume 397 records are collected as encrypted data encrypted by the host encryption controller 214; in another embodiment, however, the journal volume 397 records could instead be collected in plain text form, or in the form of data encrypted by other encryption data.

Figure 20:
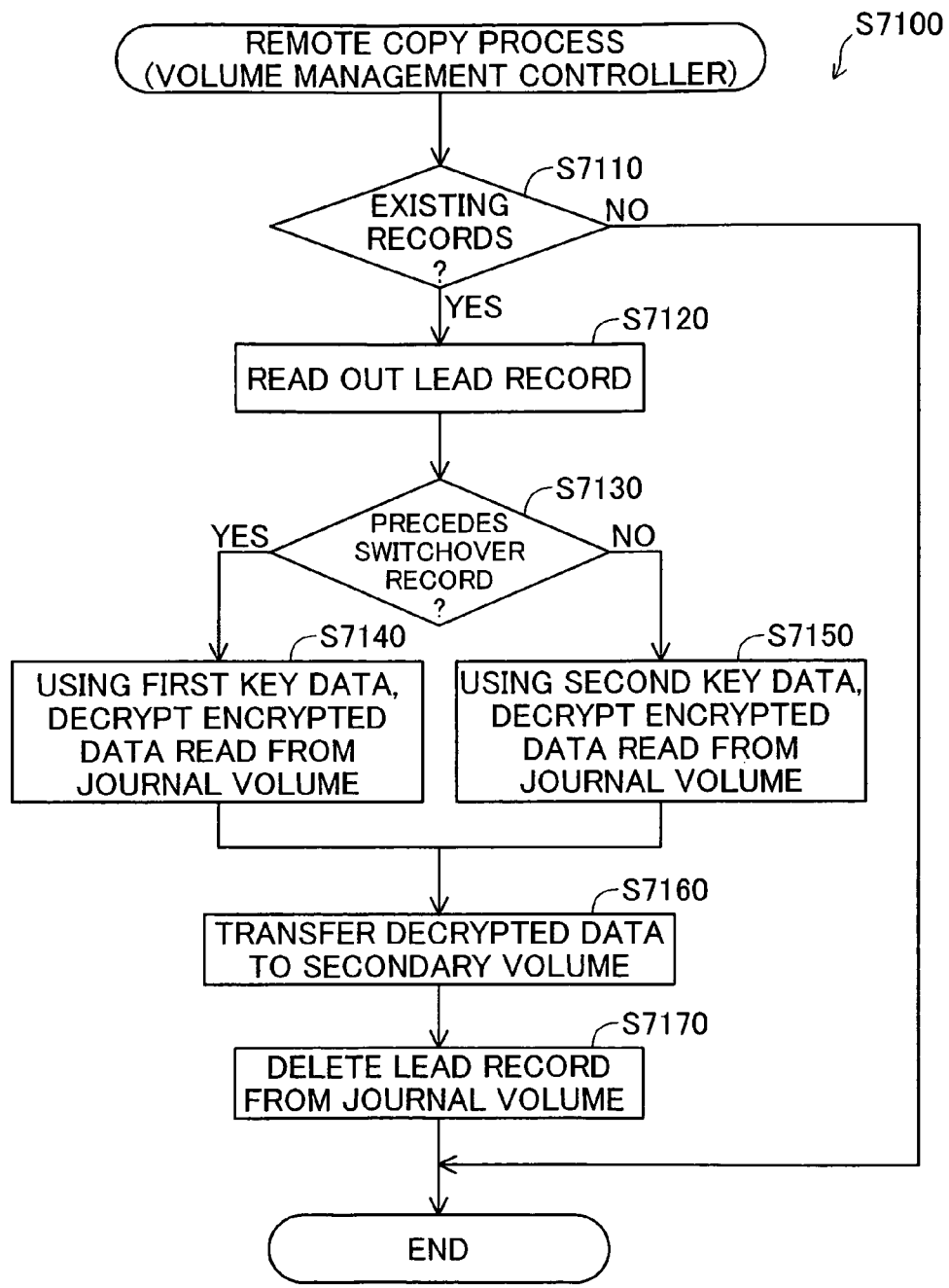
FIG. 20 is a flowchart of a remote copy process executed by the volume management controller in Embodiment 6.

FIG. 20 is a flowchart of a remote copy process (Step S7100) executed by the volume management controller 314 in Embodiment 6. In the present embodiment, the remote copy process of FIG. 20 (Step S7100) is implemented through software-controlled operation of the CPU 310 of the storage system 34. In the present embodiment, the volume management controller 314 executes the remote copy process of FIG. 20 (Step S7100) on a periodic basis.

When the remote copy process of FIG. 20 (Step S7100) is initiated, the volume management controller 314 checks the journal data 937 to determine whether there are any records collected in the journal volume 397 (Step S7110). In the event that there are records collected in the journal volume 397 (Step S7110), the volume management controller 314 reads out from the journal volume 397 the lead record having precedence in the processing order, from among the records collected in the journal volume 397 (Step S7120).

In the event that the record read out from the journal volume 397 precedes the record indicated by the switchover record 938, that is, where the record read out from the journal volume 397 is old encrypted data (Step S7130), the volume management controller 314 will use the old key data 901 held in the volume management controller 314 to decrypt the old encrypted data that was read out from the journal volume 397 (Step S7140). On the other hand, if the record read out from the journal volume 397 comes after the record indicated by the switchover record 938, that is, where the record read out from the journal volume 397 is new encrypted data (Step S7130), the volume management controller 314 will use the new key data 902 held in the volume management controller 314 to decrypt the new encrypted data included in the record that was read out from the journal volume 397 (Step S7150).

Once the volume management controller 314 decrypts into plain data the record that was read out from the journal volume 397 (Steps S7140 and S7150), the plain data is transferred to the secondary volume 396 (Step S7160). In the present embodiment, the plain data transferred to the secondary volume 396 is compressed for transmission. Once the volume management controller 314 transfers the data to the secondary volume 396 (Step S7160), the record corresponding to the data is deleted from the journal volume 397 (Step S7170).

According to the storage system in Embodiment 6 described hereinabove, the cryptographic conversion process (FIG. 8, Step S3400) can be executed in the storage system 38, while configuring a copy of the volume 390 in the secondary volume 396.

G. Other Embodiments

While the invention has been described hereinabove in terms of certain preferred embodiments, the invention is in no way limited to these, and may be reduced to practice in various other ways without departing from the spirit thereof. The following embodiments and applied examples would be possible, for example.

The volume management controller may further include: a write decryption unit that, when data stored at a block address specified by a write command sent after the rekey command reception unit receives the transmitted rekey command is data encrypted with the first key data, decrypts write-data requested by the write command received after the rekey command, using the second key data stored in the volume key data memory; a write encryption unit that, using the first key data stored in the volume key data memory, encrypts the write-data decrypted by the write decryption unit; and a non-conversion write unit that writes the write-data encrypted with the first key data by the write encryption unit, to the block address specified by the write command after the rekey command.

According to the computer system described above, it is possible to avoid a situation where, in response to a write command, volume data saved in the volume is overwritten with data encrypted with new key data before the volume data has undergone the cryptographic conversion process, thereby making it easy to manage which volume data has been re-encrypted during the cryptographic conversion process.

The volume management controller may further include: a non-conversion read unit that, when read-data stored at a block address specified by a read command sent after the rekey command reception unit receives the rekey command is data encrypted with the first key data, reads out the read-data stored at the block address specified by the read command received after the rekey command; a read decryption unit that, using the first key data stored in the volume key data memory, decrypts the read-data read out by the non-conversion read unit; a read encryption unit that, using the second key data stored in the volume key data memory, encrypts the read-data decrypted by the read decryption unit; and a read response unit that, in response to the read command after the rekey command, sends to the host computer system via the network the data encrypted with the second key data by the read encryption unit.

According to the computer system described above, in the event of a request to read volume data that has yet to be re-encrypted, the host computer system can be provided in response with data that has been re-encrypted with new key data, and thus the cryptographic conversion process can be executed on the storage system end, while handling read access from the host computer system.

The volume management controller may further include a key data deletion unit that, when all of the data stored in the volume is converted to data encrypted with the second key data after the rekey command reception unit receives the transmitted rekey command, deletes the first and second key data stored in the volume key data memory. According to the computer system described above, when the cryptographic conversion process has been completed, the key data is deleted from the storage system end, and thus security against leakage of information from the storage system can be improved.

The conversion read unit of the volume management controller may read the data encrypted with the first key data, from the volume sequentially in order of the series of block addresses assigned to the volume when the rekey command reception unit receives the transmitted rekey command. According to the computer system described above, since re-encryption of volume data is carried out sequentially for the series of block addresses, during the cryptographic conversion process it is possible to easily manage which volume data has been re-encrypted.

The host encryption controller may be disposed to the host computer system. The storage system may include, a virtualization device that is coupled with the host computer system via a second network different from the first network, and virtually constitutes a virtual volume associated with the volume to make the volume accessible indirectly from the host computer system via the second network, and a first storage system that is coupled with the virtualization device via the first network, and constitutes the volume accessible from the virtualization device via the first network; the host encryption controller may be provided to the virtualization device; and the volume management controller may be provided to the first storage system. According to the computer system described above, it is possible to reduce the processing load on the host computer system end in instances where key data is modified, while ensuring security against leakage of information.

The storage system may include, a base volume for storing a copy of data stored to the volume at a set time, a first journal volume for collecting a copy of data written to the volume subsequent to the set time, the copy of the written data being associated with write history of the written data, and a volume restore unit that, using the data stored in the base volume and the data collected in first journal volume, configures a restore volume for restoring the volume at an intended point in time subsequent to the set time; and the volume restore unit may include, a restore decryption unit that, after the rekey command reception unit receives the transmitted rekey command, selects, from the data of the base volume and the first journal volume, data encrypted using the first key data for use in configuring the restore volume, and decrypts selected data using the first key data stored in the volume key data memory, a restore encryption unit that, using the second key data stored in the volume key data memory, encrypts the data decrypted by the restore decryption unit, and a restore incorporation unit that incorporates the data encrypted by the restore encryption unit into the restore volume. According to the computer system described above, the cryptographic conversion process can be executed on the storage system end, while implementing Continuous Data Protection (CDP) in the storage system. Here, Continuous Data Protection refers to a format for restoring the configuration of the volume at any previous point in time, by means of storing write history together with the data written to the volume.

The volume of the storage system may include, a first volume for storing data encrypted with the first key data, and a second volume assigned a series of block addresses shared with the first volume after the rekey command reception unit receives the transmitted rekey command, and utilized for storing data subsequently encrypted with the second key data from the data stored in the first volume; the conversion read unit of the volume management controller may read out data encrypted with the first key data from an original first block address in the first volume when the rekey command reception unit receives the transmitted rekey command; and the conversion write unit of the volume management controller may write the data encrypted with the second key data by the conversion encryption unit, to a block address of the second volume corresponding to the original first block address of the first volume. According to the computer system described above, data is duplicated to first and second volumes, whereby loss of data during the cryptographic conversion process can be prevented.

The volume management controller may further include: a first write decryption unit that, when data of a block address specified by a write command sent after the rekey command reception unit receives the transmitted rekey command has not been taken over from the first volume by the second volume, decrypts write-data requested by the write command received after the rekey command, using the second key data stored in the volume key data memory; a first write encryption unit that, using first key data stored in the volume key data memory, encrypts the write-data decrypted by the first write decryption unit; a first takeover write unit that writes the write-data encrypted with the first key data by the first write encryption unit, to the specified block address in the first volume; and a second takeover write unit that, when data of a block address specified by a write command sent after the rekey command reception unit receives the transmitted rekey command has been taken over from the first volume by the second volume, writes the write-data requested by the write command received after the rekey command, to the specified block address in the second volume. According to the computer system described above, in the event of a request to write to a block address containing data that has not yet taken over from the first volume by the second volume, the data of the write request will be encrypted with the first key data and written to the first volume, whereby the data can be taken over from the first volume by the second volume while handing write access from the host computer system.

The volume management controller may further include: a second write decryption unit that, when data of a block address specified by a write command sent after the rekey command reception unit receives the transmitted rekey command has been taken over from the first volume by the second volume, decrypts write-data requested by the write command received after the rekey command, using the second key data stored in the volume key data memory; a second write encryption unit that, using first key data stored in the volume key data memory, encrypts the data decrypted by the second write decryption unit; and a third takeover write unit that writes the data encrypted with the first key data by the second write encryption unit, to the specified block address in the first volume. According to the computer system described above, data loss can be prevented even in the event that the rekey process is interrupted, due to the fact that the data encrypted with the first key data, including the data of a write request made during the cryptographic conversion process, remains on the first volume.

The volume management controller may further include: a first takeover read unit that, when read-data stored at a block address specified by a read command sent after the rekey command reception unit receives the transmitted rekey command has not been taken over from the first volume by the second volume, reads out the read-data stored at the specified block address in the first volume; a read decryption unit that, using first key data stored in the volume key data memory, decrypts the read-data read out by the first takeover read unit; a read encryption unit that, using second key data stored in the volume key data memory, encrypts the read-data decrypted by the read decryption unit; a first takeover read response unit that, in response to the read command, sends the read-data encrypted with the second key data by the read encryption unit, to the host computer system via the network; a second takeover read unit that, when read-data stored at a block address specified by a read command sent after the rekey command reception unit receives the transmitted rekey command has been taken over from the first volume by the second volume, reads out the read-data stored at the specified block address in the second volume; and a second takeover read response unit that, in response to the read command, sends the read-data read out by the second takeover read unit and encrypted with the second key data, to the host computer system via the network. According to the computer system described above, in the event of a request to read volume data that has yet to be taken over by the second volume, the host computer system can be provided in response with data that has been re-encrypted with new key data, and thus the cryptographic conversion process can be executed on the storage system end, while handling read access from the host computer system.

The storage system may further include: a secondary volume assigned a series of block addresses associated with the volume, for storing a copy of data stored to the volume; a second journal volume that temporarily collects a copy of data written to the volume subsequent to the write command, the copy of the written data being associated with write history of the written data; a first journal decryption unit that, when the data collected in the second journal volume is encrypted with the first key data, decrypts the data collected in the second journal volume, using the first key data stored in the volume key data memory; a first journal transfer unit that transfers to the secondary volume the data decrypted by the first journal decryption unit; a second journal decryption unit that, when the data collected in the second journal volume is encrypted with the second key data, decrypts the data collected in the second journal volume, using the second key data stored in the volume key data memory; a second journal transfer unit that transfers to the secondary volume the data decrypted by the second journal decryption unit. According to the computer system described above, cryptographic conversion process can be executed on the storage system end while configuring a copy of the volume in the secondary volume.

A storage system according to an aspect of the invention is a storage system coupled via a network with a host computer system that processes data, the storage system comprising a volume accessible through specification of a series of block addresses from the host computer system via the network, wherein the host computer system includes: a host key data memory for storing key data to be used in encryption and decryption of data; a host encryption unit that, when write-data to be written to the volume in response to a write command issued from the host computer system to the storage system is transferred from the host computer system to the volume via the network, encrypts the write-data using the key data stored in the host key data memory, before transferring the write-data over the network; a host decryption unit that, when read-data to be read from the volume in response to a read command issued from the host computer system to the storage system is transferred from the volume to the host computer system via the network, decrypts the read-data using the key data stored in the host key data memory, after transferring the read-data over the network; a rekeying unit that changes the key data stored in the host key data memory from first key data to second key data; and a rekey command transmission unit that, when the rekeying unit changes the key data stored in the host key data memory to second key data, transmits to the volume management controller a rekey command containing the first and second key data, the storage system further comprising: a rekey command reception unit that receives the rekey command transmitted by the rekey command transmission unit; a volume key data memory for storing the first and second key data contained in the rekey command received by the rekey command reception unit; a conversion read unit that, when the rekey command reception unit receives the transmitted rekey command, reads out data encrypted with the first key data from an original block address in the volume; a conversion decryption unit that, using the first key data stored in the volume key data memory, decrypts the data read out by the conversion read unit; a conversion encryption unit that, using the second key data stored in the volume key data memory, encrypts the data decrypted by the conversion decryption unit; and a conversion write unit that writes the data encrypted with the second key data by the conversion encryption unit, to the original block address.

According to the storage system described above, in the event that the key data used for encryption/decryption of access data has changed on the host computer system, re-encryption of volume data stored in the volume can be executed by the storage system. As a result, it is possible to reduce the processing load on the host computer system end in instances where key data is modified, while ensuring security against leakage of information.

A data management method according to an aspect of the invention is a data management method for managing data handled by a computer system that comprises a host computer system for processing data, and a storage system having a volume accessible through specification of a series of block addresses from the host computer system via a network, key data for use in encryption and decryption of data is stored in a host key data memory of the host computer system, the method comprising: encrypting, on the host computer system, when write-data to be written to the volume in response to a write command issued from the host computer system to the storage system is transferred from the host computer system to the volume via the network, the write-data using the key data stored in the host key data memory, before transferring the write-data over the network; decrypting, on the host computer system, when read-data to be read from the volume in response to a read command issued from the host computer system to the storage system is transferred from the volume to the host computer system via the network, the read-data using the key data stored in the host key data memory, after transferring the read-data over the network; changing the key data stored in the host key data memory from first key data to second key data; transmitting, when the key data stored in the host key data memory is changed to second key data, a rekey command containing the first and second key data from host computer system to the storage system; receiving, on the storage system, the rekey command transmitted from host computer system; storing the first and second key data contained in the received rekey command to a volume key data memory of the storage system; reading out, when the transmitted rekey command is received, data encrypted with the first key data from an original block address in the volume; decrypting the data read out from the volume using the first key data stored in the volume key data memory; encrypting the data decrypted by the first key data using the second key data stored in the volume key data memory; and writing the data encrypted with the second key data to the original block address.

According to the data management method described above, where encryption/decryption of access data exchanged between the host computer system and the volume is carried out by the host computer system, in the event that the key data used for encryption/decryption of the access data should change, re-encryption of volume data stored in the volume can be executed by the storage system. As a result, it is possible to reduce the processing load on the host computer system end in instances where key data is modified, while ensuring security against leakage of information.

Although the invention has been described and illustrated in detail, it is clearly understood that the same is by way of illustration and example only and is not to be taken by way of limitation, the spirit and scope of the invention being limited only by the terms of the appended claims.

What is claimed is:

1. A computer system, comprising:
    a host computer system that processes data;
    a storage system separate from the host computer system the storage system including:
        a volume accessible through specification of a series of block addresses from the host computer system via a network;
        a base volume for storing a copy of data stored to the volume at a set time;
        a first journal volume for collecting a copy of data written to the volume subsequent to the set time, the copy of the written data being associated with write history of the written data; and
        a volume restore unit that, using the data stored in the base volume and the data collected in the first journal volume, configures a restore volume for restoring the volume at an intended point in time subsequent to the set time;
    a host encryption controller that, on the host computer system end of the network on an access path leading from the host computer system to the volume via the network, controls encryption and decryption of data passing over the access path; and
    a volume management controller that, in the storage system, manages data stored in the volume;
    wherein the host encryption controller includes:
        a host key data memory for storing key data to be used in encryption and decryption of data;
        a host encryption unit that, when write-data to be written to the volume in response to a write command issued from the host computer system to the storage system is transferred from the host computer system to the volume via the network, encrypts the write-data using the key data stored in the host data memory, before transferring the write-data over the network;
        a host decryption unit that, when read-data to be read from the volume in response to a read command issued from the host computer system to the storage system is transferred from the volume to the host computer system via the network, decrypts the read-data using the key data stored in the host key data memory, after transferring the read-data over the network;
        a rekeying unit that changes the key data stored in the host key data memory from first key data to second key data; and
        a rekey command transmission unit that, when the rekeying unit changes the key data stored in the host key data memory to second key data, transmits to the volume management controller a rekey command containing the first and second key data;
    the volume management controller includes:
        a rekey command reception unit that receives the rekey command transmitted by the rekey command transmission unit;
        a volume key data memory for storing the first and second key data contained in the rekey command received by the rekey command reception unit;
        a conversion read unit that, when the rekey command reception unit receives transmitted rekey command, reads out data encrypted with the first key data from an original block address in the volume;
        a conversion decryption unit that, using the first key data stored in the volume key data memory, decrypts the data read out by the conversion read unit;
        a conversion encryption unit that, using the second key data stored in the volume key data memory, encrypts the data decrypted by the conversion decryption unit; and
        a conversion write unit that writes the data encrypted with the second key data by the conversion encryption unit, to the original block address; and
    the volume restore unit includes:
        a restore decryption unit that, after the rekey command reception unit receives the transmitted rekey command, selects, from the data of the base volume and the first journal volume, data encrypted using the first key data for use in configuring the restore volume, and decrypts selected data using the first key data stored in the volume key data memory;
        a restore encryption unit that, using the second key data stored in the volume key data memory, encrypts the data decrypted by the restore decryption unit; and
        a restore incorporation unit that incorporates the data encrypted by the restore encryption unit into the restore volume.

2. The computer system according to claim 1, wherein the volume of the storage system includes:
    a first volume for storing data encrypted with the first key data; and
    a second volume assigned a series of block addresses shared with the first volume after the rekey command reception unit receives the transmitted rekey command, and utilized for storing data subsequently encrypted with the second key data from the data stored in the first volume;

the conversion read unit of the volume management controller reads out data encrypted with the first key data from an original first block address in the first volume when the rekey command reception unit receives the transmitted rekey command; and the conversion write unit of the volume management controller writes the data encrypted with the second key data by the conversion encryption unit to a block address of the second volume corresponding to the original first block address of the first volume; and the volume management controller further includes:

a first write decryption unit that, when data of a block address specified by a write command sent after the rekey command reception unit receives the transmitted rekey command has not been taken over from the first volume by the second volume, decrypts write-data requested by the write command received after the rekey command, using the second key data stored in the volume key data memory;

a first write encryption unit that, using first key data stored in the volume key data memory, encrypts the write-data decrypted by the first write decryption unit;

a first takeover write unit that writes the write-data encrypted with the first key data by the first write encryption unit, to the specified block address in the first volume; and a second takeover write unit that, when data of a block address specified by a write command sent after the rekey command reception unit receives the transmitted rekey command has been taken over from the first volume by the second volume, writes the write-data requested by the write command received after the rekey command, to the specified block address in the second volume.

3. The computer system according to claim 2, wherein the volume management controller further includes:

a second write decryption unit that, when data of a block address specified by a write command sent after the rekey command reception unit receives the transmitted rekey command has been taken over from the first volume by the second volume, decrypts write-data requested by the write command received after the rekey command, using the second key data stored in the volume key data memory;

a second write encryption unit that, using first key data stored in the volume key data memory, encrypts the data decrypted by the second write decryption unit; and a third takeover write unit that writes the data encrypted with the first key data by the second write encryption unit, to the specified block address in the first volume.

4. The computer system according to claim 1, wherein the volume of the storage system includes:

a first volume for storing data encrypted with the first key data; and a second volume assigned a series of block addresses shared with the first volume after the rekey command reception unit receives the transmitted rekey command, and utilized for storing data subsequently encrypted with the second key data from the data stored in the first volume;

the conversion read unit of the volume management controller reads out data encrypted with the first key data from an original first block address in the first volume when the rekey command reception unit receives the transmitted rekey command; and the conversion write unit of the volume management controller writes the data encrypted with the second key data by the conversion encryption unit, to a block address of the second volume corresponding to the original first block address of the first volume; and the volume management controller further includes:

a first takeover read unit that, when read-data stored at a block address specified by a read command sent after the rekey command reception unit receives the transmitted rekey command has not been taken over from the first volume by the second volume, reads out the read-data stored at the specified block address in the first volume;

a read decryption unit that, using first key data stored in the volume key data memory, decrypts the read-data read out by the first takeover read unit;

a read encryption unit that, using second key data stored in the volume key data memory, encrypts the read-data decrypted by the read decryption unit;

a first takeover read response unit that, in response to the read command, sends the read-data encrypted with the second key data by the read encryption unit, to the host computer system via the network;

a second takeover read unit that, when read-data stored at a block address specified by a read command sent after the rekey command reception unit receives the transmitted rekey command has been taken over from the first volume by the second volume, reads out the read-data stored at the specified block address in the second volume; and a second takeover read response unit that, in response to the read command, sends the read-data read out by the second takeover read unit and encrypted with the second key data, to the host computer system via the network.

5. The computer system according to claim 1, wherein the storage system further includes:

a secondary volume assigned a series of block addresses associated with the volume, for storing a copy of data stored to the volume;

a second journal volume that temporarily collects a copy of data written to the volume subsequent to the write command, the copy of the written data being associated with write history of the written data;

a first journal decryption unit that, when the data collected in the second journal volume is encrypted with the first key data, decrypts the data collected in the second journal volume, using the first key data stored in the volume key data memory;

a first journal transfer unit that transfers to the secondary volume the data decrypted by the first journal decryption unit;

a second journal decryption unit that, when the data collected in the second journal volume is encrypted with the second key data, decrypts the data collected in the second journal volume, using the second key data stored in the volume key data memory;

a second journal transfer unit that transfers to the secondary volume the data decrypted by the second journal decryption unit.

* * * * *